(12) United States Patent
Fujii et al.

(10) Patent No.: US 7,716,594 B2
(45) Date of Patent: *May 11, 2010

(54) INFORMATION PROCESSING APPARATUS, INFORMATION PROCESSING METHOD, RECORDING MEDIUM, AND PROGRAM

(75) Inventors: Katsushi Fujii, Chiba (JP); Shinichi Kanai, Saitama (JP); Takao Yoshimine, Kanagawa (JP); Shigehiko Nishizawa, Kanagawa (JP); Junichi Miyazaki, Tokyo (JP); Yousuke Noumi, Tokyo (JP)

(73) Assignee: Sony Corporation, Tokyo (JP)

( * ) Notice: Subject to any disclaimer, the term of this patent is extended or adjusted under 35 U.S.C. 154(b) by 491 days.

This patent is subject to a terminal disclaimer.

(21) Appl. No.: 10/067,304

(22) Filed: Feb. 7, 2002

(65) Prior Publication Data
US 2002/0133542 A1  Sep. 19, 2002

(30) Foreign Application Priority Data
Feb. 13, 2001  (JP)  ............................ 2001-035684

(51) Int. Cl.
*G06F 3/00* (2006.01)
(52) U.S. Cl. ...................... 715/753; 715/748; 715/751; 715/756; 715/757; 715/758

(58) Field of Classification Search ................. 715/753, 715/752, 756–758, 759, 748, 751
See application file for complete search history.

(56) References Cited

U.S. PATENT DOCUMENTS

| | | | |
|---|---|---|---|
| 5,852,656 A * | 12/1998 | Sato et al. ................. | 379/93.21 |
| 6,363,352 B1 * | 3/2002 | Dailey et al. .................. | 705/9 |
| 6,772,393 B1 * | 8/2004 | Estrada et al. .............. | 715/512 |
| 2001/0023430 A1 * | 9/2001 | Srinivasan .................. | 709/204 |
| 2002/0071540 A1 * | 6/2002 | Dworkin ................ | 379/202.01 |
| 2002/0178222 A1 * | 11/2002 | O'Hara et al. .............. | 709/205 |
| 2004/0054724 A1 * | 3/2004 | Sudo .......................... | 709/204 |
| 2005/0101338 A1 * | 5/2005 | Kraft .......................... | 455/466 |
| 2006/0090013 A1 * | 4/2006 | Achacoso et al. ............. | 710/4 |

FOREIGN PATENT DOCUMENTS

JP  11-219174  8/1999

OTHER PUBLICATIONS

U.S. Appl. No. 10/067,310, filed Feb. 7, 2002, Pending.
U.S. Appl. No. 10/067,350, filed Feb. 7, 2002, Pending.

* cited by examiner

*Primary Examiner*—Ba Huynh
(74) *Attorney, Agent, or Firm*—Oblon, Spivak, McClelland, Maier & Neustadt, L.L.P.

(57) ABSTRACT

In a service providing system, a live-distribution service for live-distributing contents supplied according to a reservation, and a chat service for providing the use of a chat space corresponding to the reservation for the live distribution are provided.

14 Claims, 29 Drawing Sheets

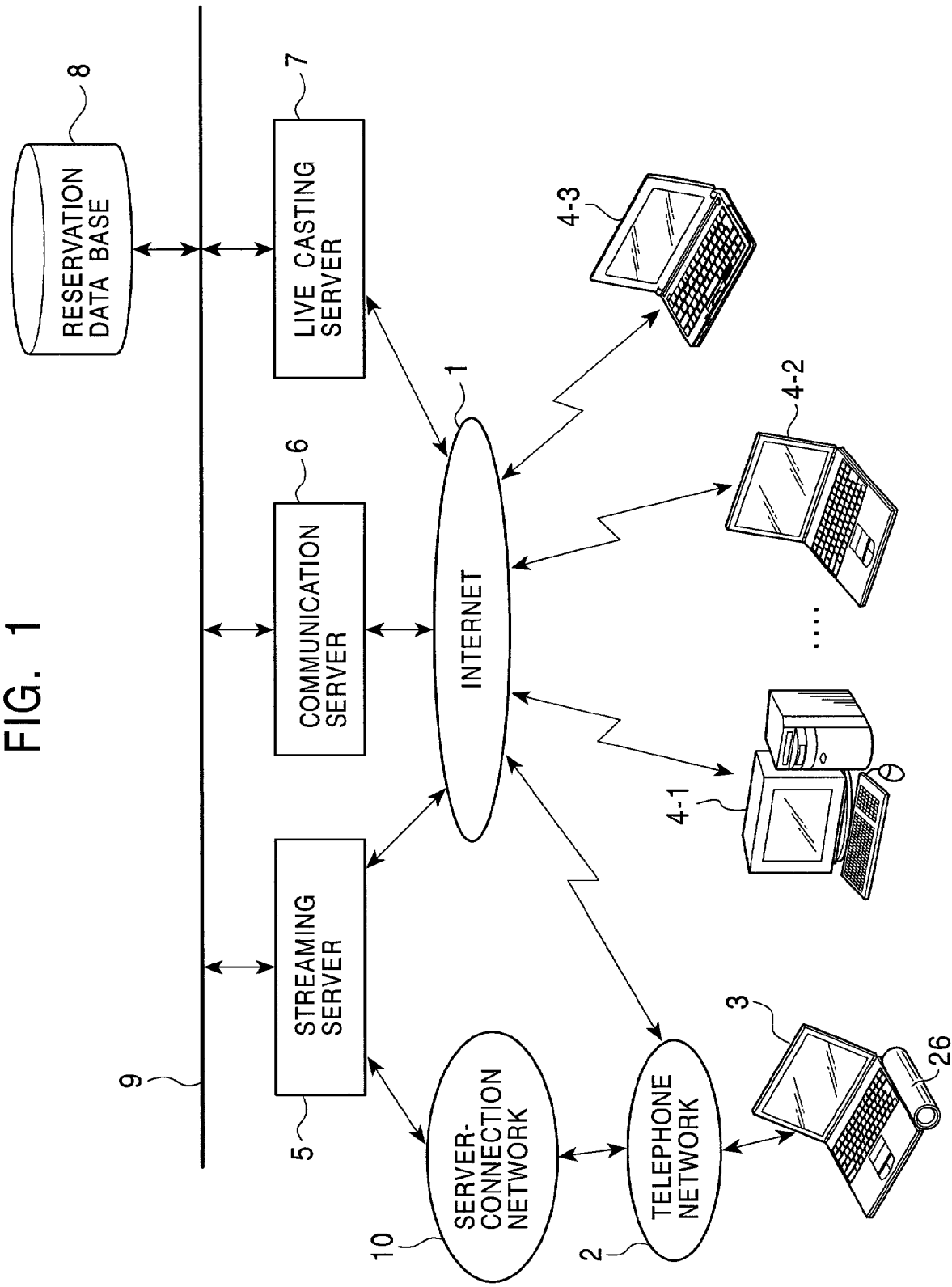

FIG. 10

| | JULY ▼ | | 2000 ◆ | | | |
|---|---|---|---|---|---|---|
| SUN | MON | TUE | WED | THU | FRI | SAT |
| | | | | | | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 | | | | | |

~231

232

| CH NO. | CAPACITY | TRANSFER BAND | CHARGE | 6:00 — 12:00 — 18:00 — 24:00 |
|---|---|---|---|---|
| 1 | 5 | 28.8 | ¥1,000 | FULL \| VACANT \| FULL \| VACANT |
| 2 | 10 | 28.8 | ¥2,000 | VACANT \| FULL FULL |
| 3 | 15 | 64 | ¥3,000 | VACANT \| FULL \| VACANT \| FULL |
| 4 | 50 | 64 | ¥10,000 | VACANT \| FULL \| VACANT \| FULL |
| 5 | 100 | 64 | ¥15,000 | FULL \| VACANT |
| 6 | 150 | 64 | ¥20,000 | VACANT \| FULL \| VACANT \| FULL |
| 7 | 1,000 | 64 | ¥50,000 | VACANT \| FULL \| VACANT |

233 {
- CHANNEL: CHANNEL 1 (UP TO FIVE PERSONS)
- RESERVATION DATE AND TIME: JULY 5, 15:00-17:00
- ACCESS LEVEL: PUBLIC, PASSWORD (SHARED PASSWORD), SECRET ( )
- LIVE TITLE: XXXX
- GENRE: MUSIC
- ACCESS TO ELECTRONIC MAIL: YES    NO
- ACCESS TO WEB: YES (URL    )    NO
- PASSWORD FOR DISTRIBUTION: XXXX
- LIST OF FRIENDS
    E-MAIL ADDRESS (ADDRESS OF PERSONAL COMPUTER 4-1)
                    (ADDRESS OF PERSONAL COMPUTER 4-2)
                    (ADDRESS OF PERSONAL COMPUTER 4-3)
- OUTLINE: UP TO 20 CHARACTERS
- DETAILS: UP TO 200 CHARACTERS

234 — [RESERVE]    [CANCEL] — 235

FIG. 11

- USER ID: ○○○○
- CHANNEL: CHANNEL 1 (UP TO 5 PERSONS)
- RESERVATION DATE AND TIME: JULY 5, 15:00-17:00
- ACCESS LEVEL: PASSWORD(SHARED ADDRESS)
- LIVE TITLE : XXXX
- GENRE: MUSIC
- ACCESS TO ELECTRONIC MAIL: YES    NO
- ACCESS TO WEB: YES (URL         )    NO
- PASSWORD FOR DISTRIBUTION: XXXX
- LIST OF FRIENDS
    E-MAIL ADDRESS (ADDRESS OF PERSONAL COMPUTER 4-1)
                   (ADDRESS OF PERSONAL COMPUTER 4-2)
                   (ADDRESS OF PERSONAL COMPUTER 4-3)
- OUTLINE: UP TO 20 CHARACTERS
- DETAILS: UP TO 200 CHARACTERS

CHARGE: ¥ XXXXX
IN ADDITION TO THIS CHARGE, COMMUNICATION
BUSINESS PARTY SEPARATELY DEMANDS PAYMENT
FOR TELEPHONE FEE FOR CALLS TO ACCESS PORT.

△△△@ ○○○.com

- CONFIRM THAT ABOVE E-MAIL ADDRESS IS CORRECT.
- RESERVATION ID WILL BE SENT TO ABOVE E-MAIL ADDRESS.
- WHEN OBTAINING RESERVATION ID, RECONFIRM IT AT MY CHANNEL BY TIME SIX HOURS BEFORE CASTING.
- IF YOU DO NOT RECONFIRM, RESERVATION IS CANCELED.

241 [CONFIRM]   242 [CANCEL]

FIG. 12

| RESERVATION CONTENTS | USER ID | SHARED PASSWORD | RESERVATION ID |
|---|---|---|---|
| • DATE: ○○○ ○○ TIME: △□ TO □△<br>• 2CH<br>• 64 kbps<br>... | ○○○○ | ×××× | ×××× |
| • DATE: △△△ ×× TIME: ○× TO ○△<br>• 4CH<br>• 28.8 kbps<br>... | ×△○○ | ×□×□× | △△△△ |
|  |  |  |  |
|  |  |  |  |
|  |  |  |  |

FIG. 14

WELCOME TO PERSONAL CASTING WORLD

- LOG IN
    USER ID:
    PASSWORD:

- MEMBER REGISTRATION
- WHAT IS PERSONAL CASTING TV?
- TODAY'S LIVE
- PROGRAM GUIDE
- MY CHANNEL
- LIVE DISTRIBUTION RESERVATION
- PROGRAM PICKUP
- IMAGE STATION

FIG. 15

MY CHANNEL

RESERVATION LIST ⟵ 251
RESERVATION DATE AND TIME, CHANNEL, TITLE,
WAITING FOR RECONFIRMATION, CANCEL
TO CHANGE DATE AND TIME OR CHANNEL, CANCEL
THIS RESERVATION AND MAKE NEW RESERVATION.

NUMBER OF VIEWERS ⟵ 252
YOU CAN SEE THE NUMBERS OF VIEWERS IN LIVE
PROGRAMS DISTRIBUTED SO FAR.

CHANGING REGISTERED-INFORMATION FILE ⟵ 253
YOU CAN CHANGE YOUR USER INFORMATION.

- USER ID: ○○○○
- CHANNEL: CHANNEL 1 (UP TO 5 PERSONS)
- RESERVATION DATE AND TIME: JULY 5, 15:00-17:00
- ACCESS LEVEL: PASSWORD (SHARED ADDRESS)
- LIVE TITLE : XXXX
- GENRE: MUSIC
- ACCESS TO ELECTRONIC MAIL: YES    NO
- ACCESS TO WEB: YES (URL          )    NO
- PASSWORD FOR DISTRIBUTION: XXXX
- LIST OF FRIENDS
      E-MAIL ADDRESS (ADDRESS OF PERSONAL COMPUTER 4-1)
                         (ADDRESS OF PERSONAL COMPUTER 4-2)
                         (ADDRESS OF PERSONAL COMPUTER 4-3)
- OUTLINE: UP TO 20 CHARACTERS
- DETAILS: UP TO 200 CHARACTERS

RESERVATION ID

- INPUT RESERVATION ID SENT BY E-MAIL.
- TO CHANGE DATE AND TIME OR CHANNEL, CANCEL THIS RESERVATION AND MAKE NEW RESERVATION.

- PRESS RECONFIRM BUTTON TO AUTOMATICALLY REGISTER PC-CONNECTION SETTING. BE SURE TO DO THAT AT APPROPRIATE PC.

251

| RECONFIRM | RETURN |

FIG. 17

RESERVATION ID: ○ ○ ○ ○

LIVE-DISTRIBUTION RESERVATION DATE AND TIME:
  2000:07:05:15:00:00-2000:07:05:17:00:00

SERVER-CONNECTION ALLOWED TIME:
  2000:07:05:14:55:00-2000:07:05:17:05:00

TELEPHONE NUMBER FOR CONNECTION
  BUSINESS PARTY 01: 03-1234-5670
  BUSINESS PARTY 02: 03-1234-5671
  BUSINESS PARTY 03: 03-1234-5672
  BUSINESS PARTY 04: 03-1234-5673

INFORMATION OF CONNECTION-DESTINATION SERVER
  SERVER TYPE: RealServer5
  SERVER NAME: LiveServer.com
  CONNECTION PORT: 555
  STREAM PATH TO SERVER: /channell/stream.rm SERVICE-REQUEST-DESTINATION ADDRESS INFORMATION:
  rtsp://liveserver.com:554/cannell/stream.rm TRANSFER BAND: 28.8 kbps

LIVE TITLE : XXXX

OUTLINE: - - - - - - - - -

ACCESS LEVEL: - - - - - - - - -

FRIENDS-LIST ADDRESS INFORMATION
  LIST 01: ADDRESS OF PERSONAL COMPUTER 4-1
  LIST 02: ADDRESS OF PERSONAL COMPUTER 4-2
  LIST 03: ADDRESS OF PERSONAL COMPUTER 4-3

SHARED PASSWORD: XXXXX

FIG. 18

SENDER: PERSONAL CASTING SERVICE
DATE AND TIME: 17:15 ON JULY 3, 2000
DESTINATION ADDRESS: △△@XX.co.jp
TITLE: NOTICE OF LIVE DISTRIBUTION
ATTACHMENT:

○○○'S (USER NAME) LIVE DISTRIBUTION WILL BE PERFORMED AS FOLLOWS:
• DISTRIBUTION DATE AND TIME: 15:00 TO 17:00 ON JULY 5
• LIVE TITLE: XXXX
• SERVICE-REQUEST-DESTINATION ADDRESS: rtsp://liveserver.com:554/channell/stream.rm
• SHARED PASSWORD: XXXXXX
• RESERVATION ID: XXXX

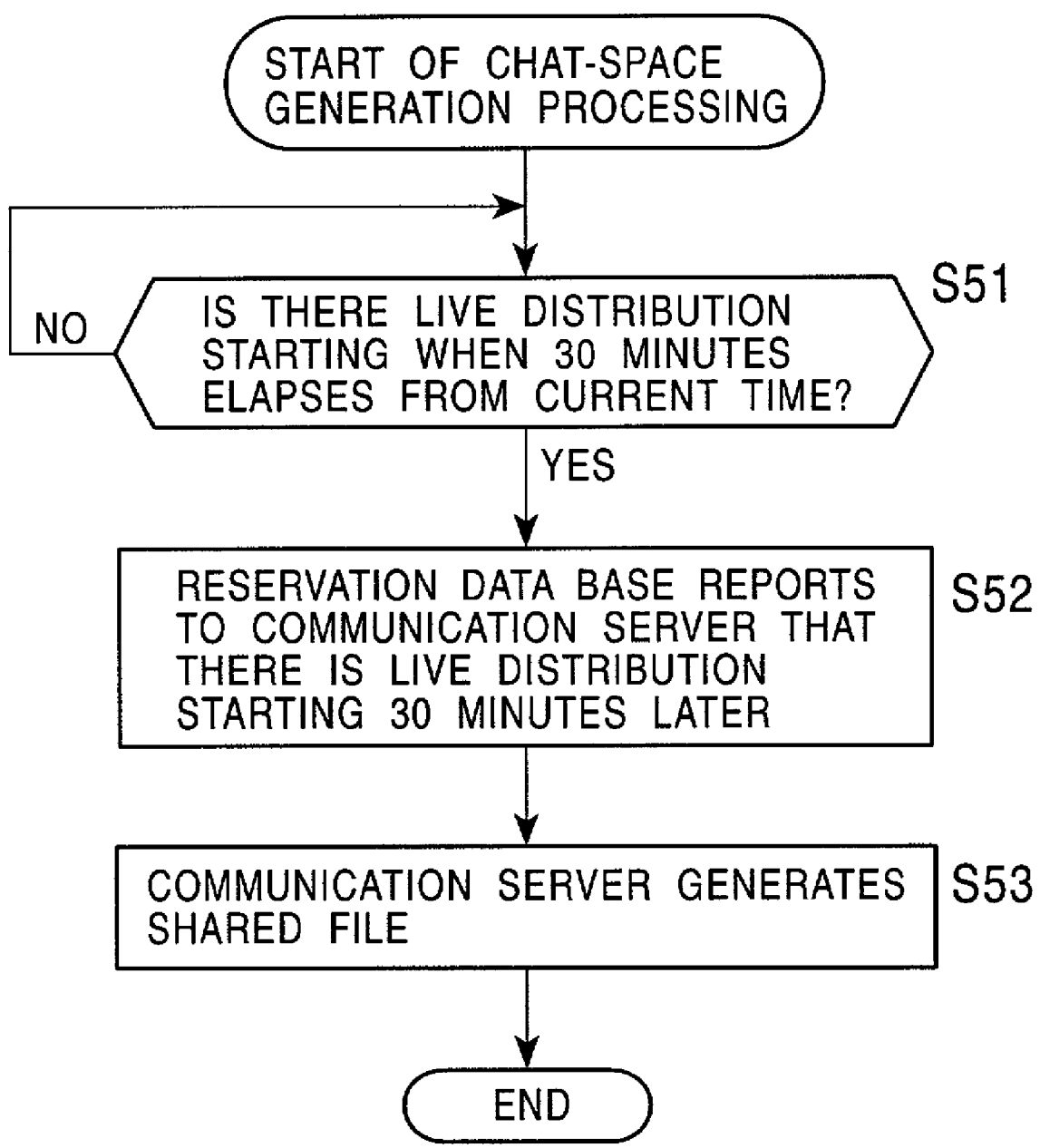

FIG. 21

CURRENT TIME  15:08  (FOR SERVICE)

GENRE: ROCK MUSIC
LIVE TITLE: ○○○○
SENDER (MAIL ADDRESS): △△△@xx.com
WEB SITE: http://www.△○△xxx.com
CAPACITY: 50 PERSONS
CLOSE OR OPEN

OUTLINE
- - - - - - - - - -
- - - - - - - - - -

DETAILS
- - - - - - - - -
- - - - - - - -

RESERVATION ID:
SHARED-PASSWORD INPUT:

| PLAY | ~261    | PLAYER SOFTWARE |

CLICK TO DOWNLOAD

NOTE: PLAYER SOFTWARE IS NECESSARY
      TO VIEW THE FILE

| CHAT | ~262

US 7,716,594 B2

INFORMATION PROCESSING APPARATUS, INFORMATION PROCESSING METHOD, RECORDING MEDIUM, AND PROGRAM

BACKGROUND OF THE INVENTION

1. Field of the Invention

The present invention relates to information processing apparatuses, information processing methods, recording media, and programs, and more particularly, to an information processing apparatus, an information processing method, a recording medium, and a program which allow a chat space corresponding to a reservation made for distributing contents to be provided.

2. Description of the Related Art

As services provided through the Internet, there have been a service (hereinafter called a live-distribution service) which distributes contents in real time according to a reservation made in advance, and a chat service which provides an environment (chat space) that allows a plurality of users to talk with each other by inputting texts.

When the user uses both of these two services, the user can view contents distributed according to a reservation made in advance while chatting with other persons who are also viewing the contents.

Conventionally, however, a chat space is provided separately from live distribution. A service has not yet developed in which viewers of live distribution chat with each other by the use of a chat space dedicated to the live distribution. In other words, a chat space where a live-distributed program is likely to be talked about has not yet been provided.

SUMMARY OF THE INVENTION

The present invention has been made in consideration of the above situation. It is an object of the present invention to allow a chat environment where a live-distributed program is likely to be talked about to be provided.

The foregoing object is achieved in one aspect of the present invention through the provision of an information processing apparatus connected through a network to a server for providing a first service of distributing contents in real time according to a reservation made in advance and to a terminal for requesting the use of the first service and the use of a second service of providing a chat space, including generation means for generating the chat space corresponding to the reservation; and providing means for providing the terminal with the chat space.

The information processing apparatus may be configured such that the generation means generates the chat space a predetermined time before a distribution start time obtained according to the reservation and deletes the chat space a predetermined time after a distribution end time.

The foregoing object is achieved in another aspect of the present invention through the provision of an information processing method for an information processing apparatus connected through a network to a server for providing a first service of distributing contents in real time according to a reservation made in advance and to a terminal for requesting the use of the first service and the use of a second service of providing a chat space, including a generation step of generating the chat space corresponding to the reservation; and a providing step of providing the terminal with the chat space.

The foregoing object is achieved in still another aspect of the present invention through the provision of a recording medium storing a computer-readable program for an information processing apparatus connected through a network to a server for providing a first service of distributing contents in real time according to a reservation made in advance and to a terminal for requesting the use of the first service and the use of a second service of providing a chat space, the program including a generation step of generating the chat space corresponding to the reservation; and a providing step of providing the terminal with the chat space.

The foregoing object is achieved in yet another aspect of the present invention through the provision of a program for an information processing apparatus connected through a network to a server for providing a first service of distributing contents in real time according to a reservation made in advance and to a terminal for requesting the use of the first service and the use of a second service of providing a chat space, the program making a computer execute processing including a generation step of generating the chat space corresponding to the reservation; and a providing step of providing the terminal with the chat space.

In an information processing apparatus, an information processing method, a recording medium, and a program according to the present invention, a chat space corresponding to a reservation is generated and a terminal is provided with the chat space. Therefore, a chat environment where the reserved live distribution is likely to be talked about is provided.

BRIEF DESCRIPTION OF THE DRAWINGS

FIG. 1 is a view showing an example structure of a service providing system according to an embodiment of the present invention.

FIG. 10 is a view showing an example display of a web page for a distribution reservation.

FIG. 11 is a view showing an example display of a web page for confirming the contents of a reservation.

FIG. 12 is a view showing contents registered in a reservation data base 8.

FIG. 14 is a view showing an example display of a top page of web pages in a live casting server 7.

FIG. 15 is a view showing an example display of the web page of "My channel."

FIG. 16 is a view showing an example display of a web page of a reconfirmation screen.

FIG. 17 is a view showing contents of a reservation-setting information file.

FIG. 18 is a view showing contents of notice mail.

FIG. 19 is a flowchart of details of processing performed in step S3 shown in FIG. 6.

FIG. 21 is a view showing an example display of a web page for displaying detailed information of live distribution reserved by the personal computer 3.

DESCRIPTION OF THE PREFERRED EMBODIMENTS

Figure 2A:
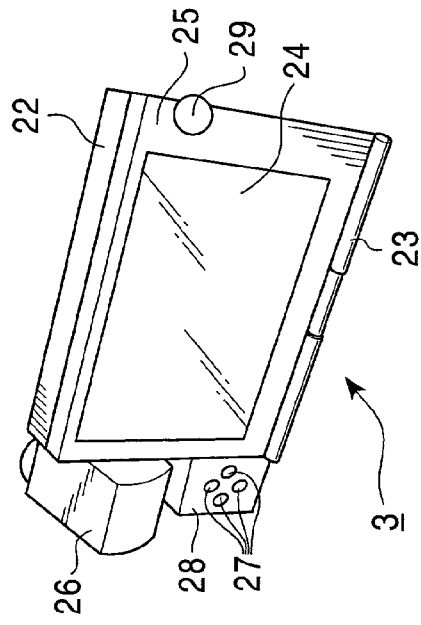
FIG. 2 is a view showing an example appearance of a personal computer 3 shown in FIG. 1.

FIG. 1 is a structural view of a service providing system according to an embodiment of the present invention.

An outline of services provided by the present system will be described first.

In the present system, a live-distribution service for applying live distribution to contents supplied according to a reservation made in advance, and a chat service for providing a chat space corresponding to the reservation for the live distribution are provided.

For example, a personal computer 3 sends information (hereinafter called a desired-reservation information file) which includes a desired distribution time slot, a distribution destination, and a predetermined password (hereinafter called a shared password) to a live casting server 7 to request a reservation for live distribution. Then, information corresponding to the desired-reservation information file is registered in a reservation data base 8 through the live casting server 7 to set the requested reservation.

When the reservation is made, the personal computer 3 sends contents to be live-distributed according to the reservation, to a streaming server 5.

Personal computers 4-1 to 4-3 (hereinafter collectively called personal computers 4 if it is not necessary to differentiate each of them) receive live distribution of the contents supplied by the personal computer 3, from the streaming server 5 according to the reservation made by the personal computer 3, and plays (reproduces) them.

More specifically, with the use of the live-distribution service of the present system, the user of the personal computer 3 can send, for example, video being captured to the users of the personal computers 4, and the users of the personal computers 4 can view it in real time.

In addition, the personal computer 3 and the personal computers 4 share a chat space provided by a communication server 6 and corresponding to the reservation of live distribution, made by the personal computer 3.

More specifically, with the use of the chat service of the present system, the user of the personal computer 3 can have a chat while capturing contents being live-distributed, and the users of the personal computers 4 can chat while viewing the contents being live-distributed.

To use the live-distribution service and the chat service, the user needs to be authenticated by the streaming server 5 and the communication server 6. The streaming server 5 and the communication server 6 both use a shared password registered in the reservation data base 8 to perform authentication.

More specifically, the user of the personal computer 3, or each of the users of the personal computers 4 can use one shared password to receive authentication from the streaming server 5 and the communication server 6 (from providing sources for providing services different from each other).

The communication server 6 generates a chat space corresponding to the reservation of live distribution a predetermined time (30 minutes, for example) before a live-distribution start time and deletes it a predetermined time (30 minutes, for example) after a live-distribution end time. In other words, during the period from 30 minutes before the live-distribution start time to 30 minutes after the live-distribution end time, the user of the personal computer 3 and the users of the personal computers 4 can have a chat for the contents of live distribution.

After the live distribution finishes, the communication server 6 sends the whole or a part of the contents of chatting performed in the chat space corresponding to the reservation for the live distribution, to the personal computer 3. With this, even if the user of the personal computer 3, who supplies the contents, could not participate in a chat with a user of the personal computers while capturing the contents, for example, the user of the personal computer 3 can check the contents of the chat later.

The structure of the service providing system according to the present embodiment will be described next.

As shown in FIG. 1, the personal computer 3 is connected to the Internet 1 through a telephone network 2 and an Internet service provider (not shown), and a plurality of (three, in the case shown in FIG. 1) personal computers 4-1 to 4-3 are connected to the Internet 1 through a telephone network, or a leased line (either not shown).

The streaming server 5, the communication server 6, and the live casting server 7 are also connected to the Internet 1.

The reservation data base 8 is connected to a leased line 9 together with the streaming server 5, the communication server 6, and the live casting server 7.

The telephone network 2 and the streaming server 5 are connected to a server-connection network 10. In other words, the personal computer 3 and the streaming server 5 are connected through the telephone network 2 and the server-connection network 10.

The personal computer 3 makes a reservation for live distribution. Details will be described later, but the personal computer 3 sends a desired-reservation information file which includes a desired live-distribution time slot, a distribution destination, and a shared password, to the live casting server 7 through the telephone network 2 and the Internet 1.

The live casting server 7 sends information corresponding to the desired-reservation information file sent from the personal computer 3 to the reservation data base 8 through the leased line 9 and registers it to set a reservation.

When the live distribution is reserved, the personal computer 3 sends video captured by a digital video camera 26 as contents of the live distribution through the telephone network 2 and the server-connection network 10 to the streaming server 5 according to the reservation.

The personal computer 3 can use a chat space provided by the communication server 6 and corresponding the reservation of the live distribution. In this case, since the personal computer 3 receives authentication from the communication server 6, the personal computer 3 sends a shared password to the communication server 6 through the Internet 1.

A personal computer 4 designated by the personal computer 3 as a distribution destination of the live distribution uses, for example, a URL written in electronic mail (hereinafter called notice mail) sent from the live casting server 7, which notices that there is a live distribution, to connect to the streaming server 5 to receive the provision of the live distribution. To receive authentication from the streaming server 5, the personal computer 4 sends the shared password and a reservation ID written in the notice mail to the streaming server 5 through the Internet 1.

In addition, the personal computer 4 can use, for example, a URL written in the notice mail to connect to the communication server 6 to use a chat space corresponding to the reservation made by the personal computer 3 for the live distribution. In this case, to receive authentication from the communication server 6, the personal computer 4 sends the shared password to the communication server 6 through the Internet 1.

The streaming server 5 authenticates the personal computer 4 which requests the provision of the live distribution reserved by the personal computer 3, with the use of the shared password and the reservation ID sent from the personal computer 4, and provides the personal computer 4 with the live distribution according to a result of authentication.

The communication server 6 generates the chat space corresponding to the reservation of the live distribution, made by the personal computer 3 a predetermined time (30 minutes, for example) before the live-distribution start time and deletes it a predetermined time (30 minutes, for example) after the live-distribution end time.

The communication server 6 authenticates the personal computer 3 or a personal computer 4 which requests the use of the chat space, by the use of the shared password sent therefrom, and provides the personal computer 3 or 4 with the chat space according to a result of authentication.

When the communication server 6 deletes the chat space, it sends the whole or a part of the contents of chatting performed in the chat space to the personal computer 3, which is the supplier of the contents.

The live casting server 7 receives a reservation for live distribution, and checks by referring to the reservation data base 8 whether a reservation can be made according to the desired-reservation information file sent from the personal computer 3. When the live casting server 7 determines that the reservation can be made, it sends information corresponding to the desired-reservation information file to the reservation data base 8 through the leased line 9 and registers the information in the data base 8 to make the reservation.

The reservation data base 8 registers information corresponding to a reservation-setting information file sent from the live casting server 7.

FIGS. 2A to 2D are perspective views of the personal computer 3.

Figure 2B:
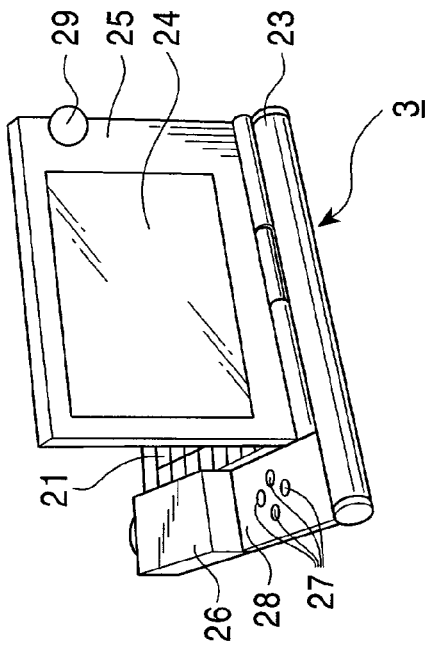
Figure 2C:
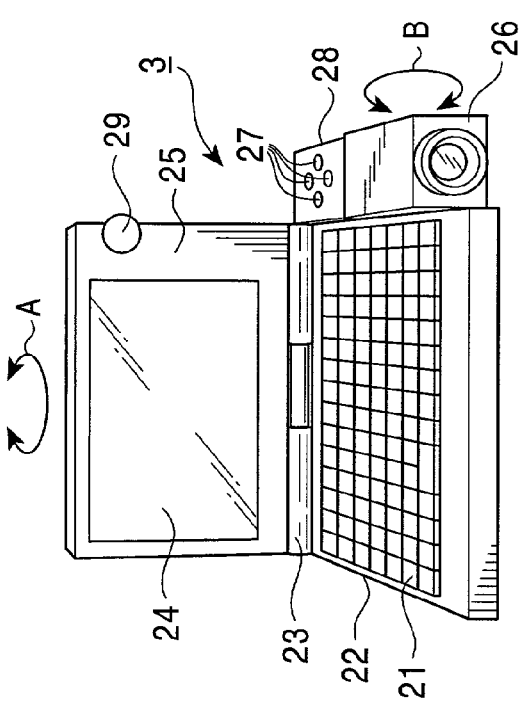

The personal computer 3 is basically formed of a keyboard-side body section 22 on which a keyboard 21 is disposed, a display-side body section 25 which is rotatably connected to the keyboard-side body section 22 through a hinge section 23 and on which a liquid-crystal screen 24 is disposed, and a digital video camera 26 mounted at a side face of the keyboard-side body section 22. FIG. 2A is a perspective view of the personal computer 3, obtained when the display-side body section 25 is opened against the keyboard-side body section 22; FIG. 2B is a perspective view of the personal computer 3, obtained when the display-side body section 25 is opened such that the rear surface of the display-side body section 25 faces the rear surface of the keyboard-side body section 22; FIG. 2C is a perspective view of the personal computer 3, obtained when the digital video camera 26 directs a direction different from that in FIG. 2B; and FIG. 2D is a perspective view of the personal computer 3, obtained when the liquid-crystal screen 24 directs a direction opposite that shown in FIG. 2A.

A button body section 28 having a plurality of (four, in the case shown in FIG. 2) operation buttons 27 is further mounted at the side face of the keyboard-side body section 22. The button body section 28 is fixed to the side face of the keyboard-side body section 22. The digital video camera 26 is supported rotatably at a point on the side face of the keyboard-side body section 22, and therefore, can be rotated in directions shown by a curve B with arrows in FIG. 2A.

The display-side body section 25 can be rotated relatively against the keyboard-side body section 22 in directions shown by a curve A with arrows in FIG. 2A. At one end of the display-side body section 25, a rotation-type operation dial 29 is provided. This operation dial 29 can be rotated, and in addition, can be pressed.

Figure 2D:
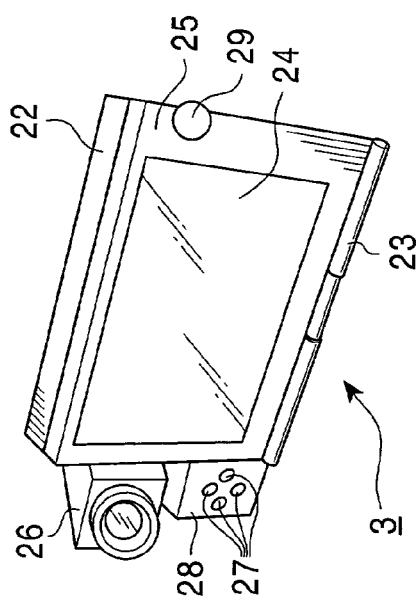

With such a structure, the personal computer 3 can be used in a form similar to that of a general notebook-type personal computer, shown in FIG. 2A, and can also be used in forms shown in FIG. 2B to FIG. 2D.

When the user uses the personal computer 3 in the form shown in FIG. 2B, for example, the user can capture images of the user by the digital video camera 26 while holding the personal computer 3. In this case, since the liquid-crystal screen 24 faces the user, the user can check an image or chat contents while capturing the image.

When the personal computer is used in this form, since the keyboard 21 is located at the far side from the user, it is difficult for the user to operate the keyboard 21 correctly. The user can operate the personal computer 3 by the use of the operation buttons 27 and the operation dial 29.

When the user uses the personal computer 3 in the form shown in FIG. 2C, the user can capture images of a subject disposed in front of the user while holding the personal computer 3 and viewing the liquid-crystal screen 24. In this case, however, although it is difficult for the user to see the contents of chatting performed correspondingly to live distribution, the user can check the contents of chatting later because the contents are sent after the live distribution.

Figure 3:
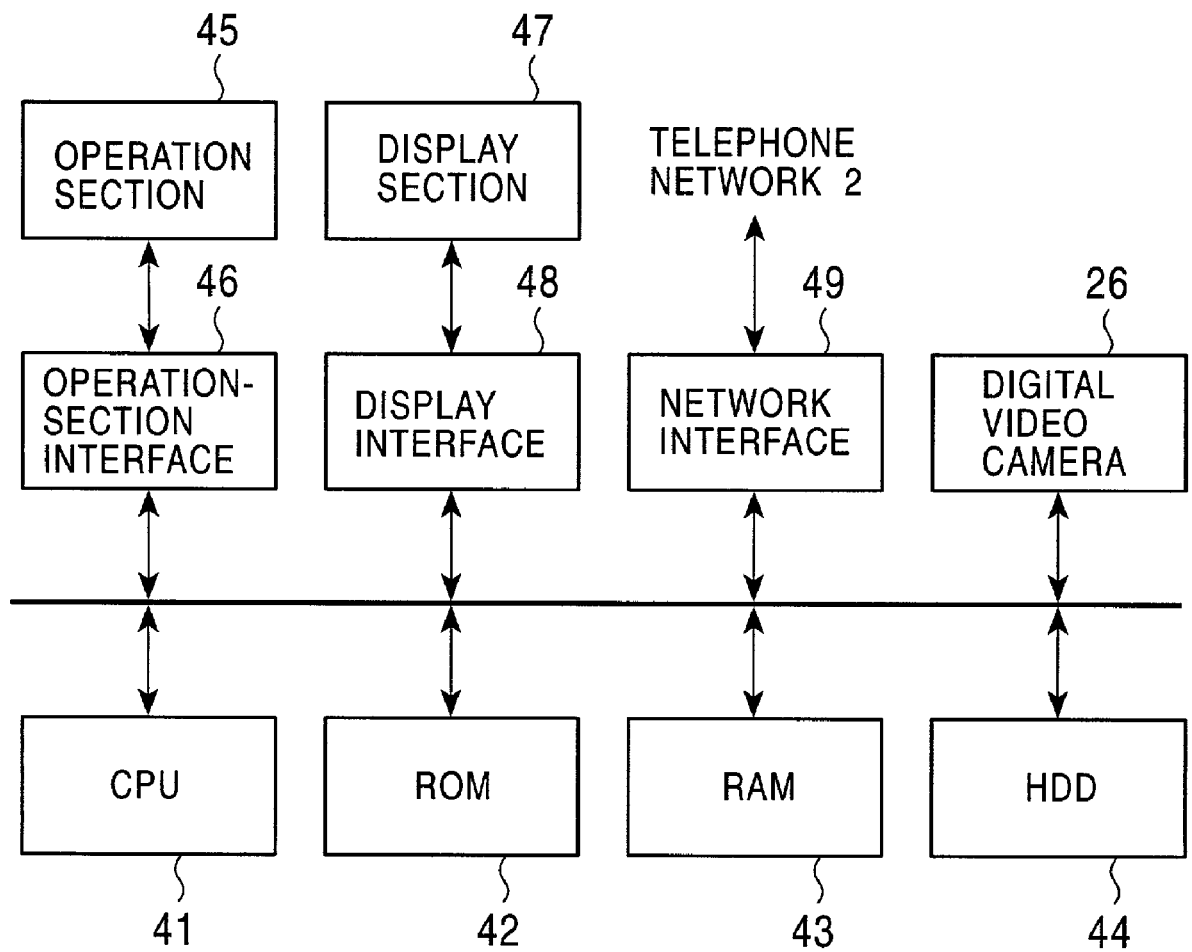
FIG. 3 is a block diagram showing an example internal structure of the personal computer 3 shown in FIG. 1.

FIG. 3 shows an internal structure of the personal computer 3.

A central processing unit (CPU) 41 executes a program stored in a read-only memory (ROM) 42 or in a hard disk 44 to perform various types of processing such as moving-image-data generation and processing, and browsing of a World Wide Web (WWW). A random-access memory (RAM) 43 stores data required when the CPU 41 executes the program, if necessary.

The hard disk 44 stores various application programs, and in addition, moving-image data and various types of control data. An operation section 45 is formed of the keyboard 21, the operation buttons 27, the operation dial 29, and others. An operation-section interface 46 sends data input from the operation section 45, to the CPU 41.

A display section 47 is formed of the liquid-crystal screen 24 and others. A display interface 48 makes the liquid-crystal screen 24 display an image corresponding to data sent from the CPU 41.

A network interface 49 communicates with an apparatus connected to the Internet 1 or to the server-connection network 10, through the telephone network 2.

Figure 4:
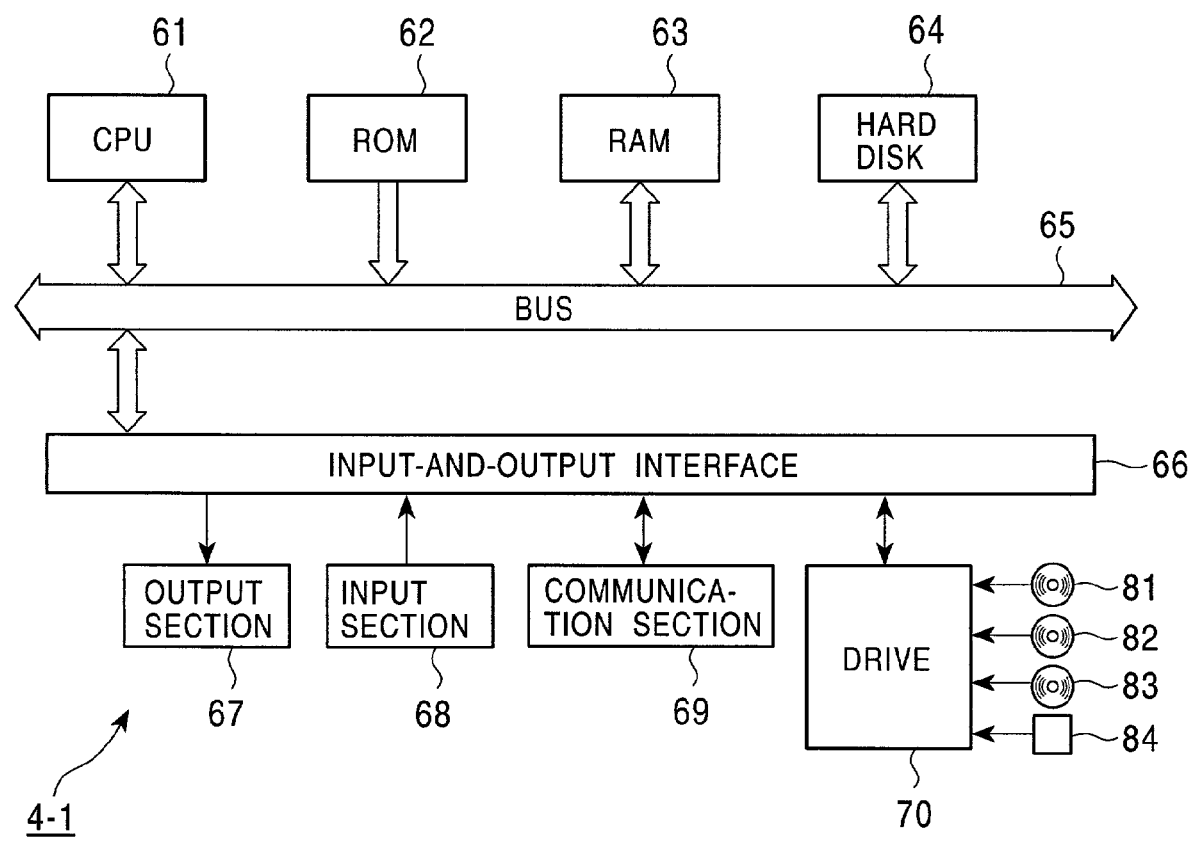
FIG. 4 is a block diagram showing an example structure of a personal computer 4-1 shown in FIG. 1.

FIG. 4 shows an example structure of the personal computer 4-1.

A CPU 61 is connected to an input-and-output interface 66 through a bus 65. When the user inputs an instruction at an input section 68 formed of a keyboard, a mouse, and others through the input-and-output interface 66, the CPU 61 loads a program stored in a recording medium, such as a ROM 62; a hard disk 64; or a magnetic disk 81, an optical disk 82, an opto-magnetic disk 83, or a semiconductor memory 84 mounted to a drive 70, into a RAM 63 and executes the program.

The CPU 61 outputs, as required, a result of processing to, for example, an output section 67 formed of a liquid-crystal display (LCD) and others, through the input-and-output interface 66.

Since the personal computers 4-2 and 4-3 basically have the same structure as the personal computer 4-1, figures and descriptions thereof are omitted.

Figure 5:
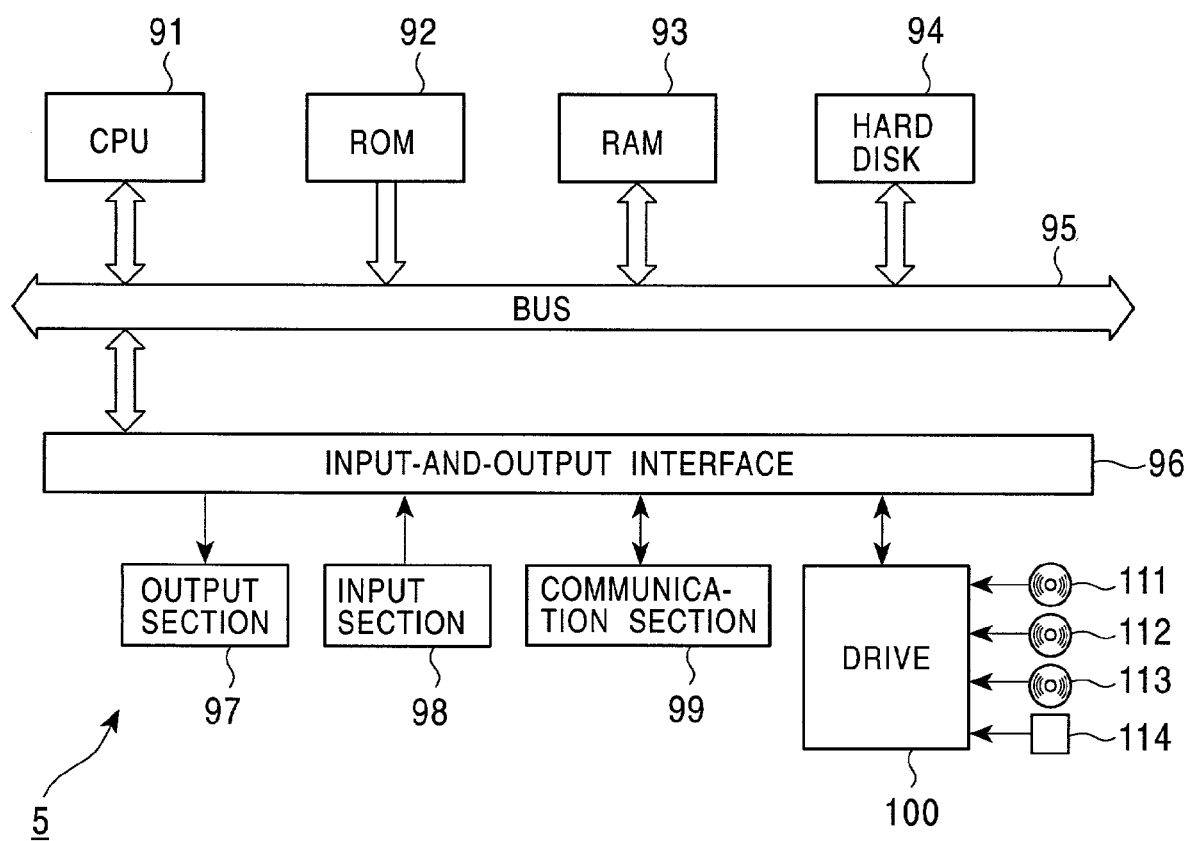
FIG. 5 is a block diagram showing an example structure of a streaming server 5 shown in FIG. 1.

FIG. 5 shows an example structure of the streaming server 5.

A CPU 91 is connected to an input-and-output interface 96 through a bus 95. When the user inputs an instruction at an input section 98 formed of a keyboard, a mouse, and others through the input-and-output interface 96, the CPU 91 loads a program stored in a recording medium, such as a ROM 92; a hard disk 94; or a magnetic disk 111, an optical disk 112, an opto-magnetic disk 113, or a semiconductor memory 114 mounted to a drive 100, into a RAM 93 and executes the program.

The CPU 91 outputs, as required, a result of processing to, for example, an output section 97 formed of an LCD and others, through the input-and-output interface 96.

Since the communication server 6, the live casting server 7, and the reservation data base 8 basically have the same structure as the streaming server 5, figures and descriptions thereof are omitted.

An operations of the service providing system according to the present embodiment will be described next by referring to a flowchart shown in FIG. 6. Outlines thereof will be described first.

In step S1, the personal computer 3 makes a distribution reservation for performing live distribution, at the live casting server 7.

Next, in step S2, the personal computer 3 reconfirms the reservation made in step S1, at the live casting server 7. In the live-distribution service in the present system, a reservation needs to be reconfirmed, for example, by the time six hours before a reservation fulfillment time (live-distribution start time). When the reservation is reconfirmed, the reservation made in step S1 is set. When the reservation is not reconfirmed, the reservation is forcibly canceled.

In step S3, the communication server 6 generates a chat space corresponding to the reservation of the live distribution a predetermined time (for example, 30 minutes) before the live-distribution start time.

Next, in step S4, the communication server 6 allows the personal computers 3 and 4 to use the chat space generated in step S3, according to a result of authentication.

In step S5, the personal computer 3 starts sending video (contents) being captured, a predetermined time (for example, five minutes) before the live-distribution start time, to the streaming server 5.

Next, in step S6, the streaming server 5 applies stream-distribution to the contents supplied by the personal computer 3, to the personal computers 4 according to a result of authentication.

In step S7, the communication server 6 deletes the chat space generated in step S3 when a predetermined time (30 minutes, for example) elapses from a live-distribution end time. At the same time, the communication server 6 sends the whole or a part of the contents of the chat performed in the chat space, to the personal computer 3.

Then, the operation is finished.

Details of processing performed in step S1 to step S7 of FIG. 6 will be sequentially described next.

Distribution reservation processing performed in step S1 will be described first by referring to a flowchart shown in FIG. 7.

In step S11, the CPU 41 of the personal computer 3 controls the network interface 49 to send a signal for requesting browsing of a web page for distribution reservation to the live casting server 7 through the telephone network 2 and the Internet 1.

Figure 8:
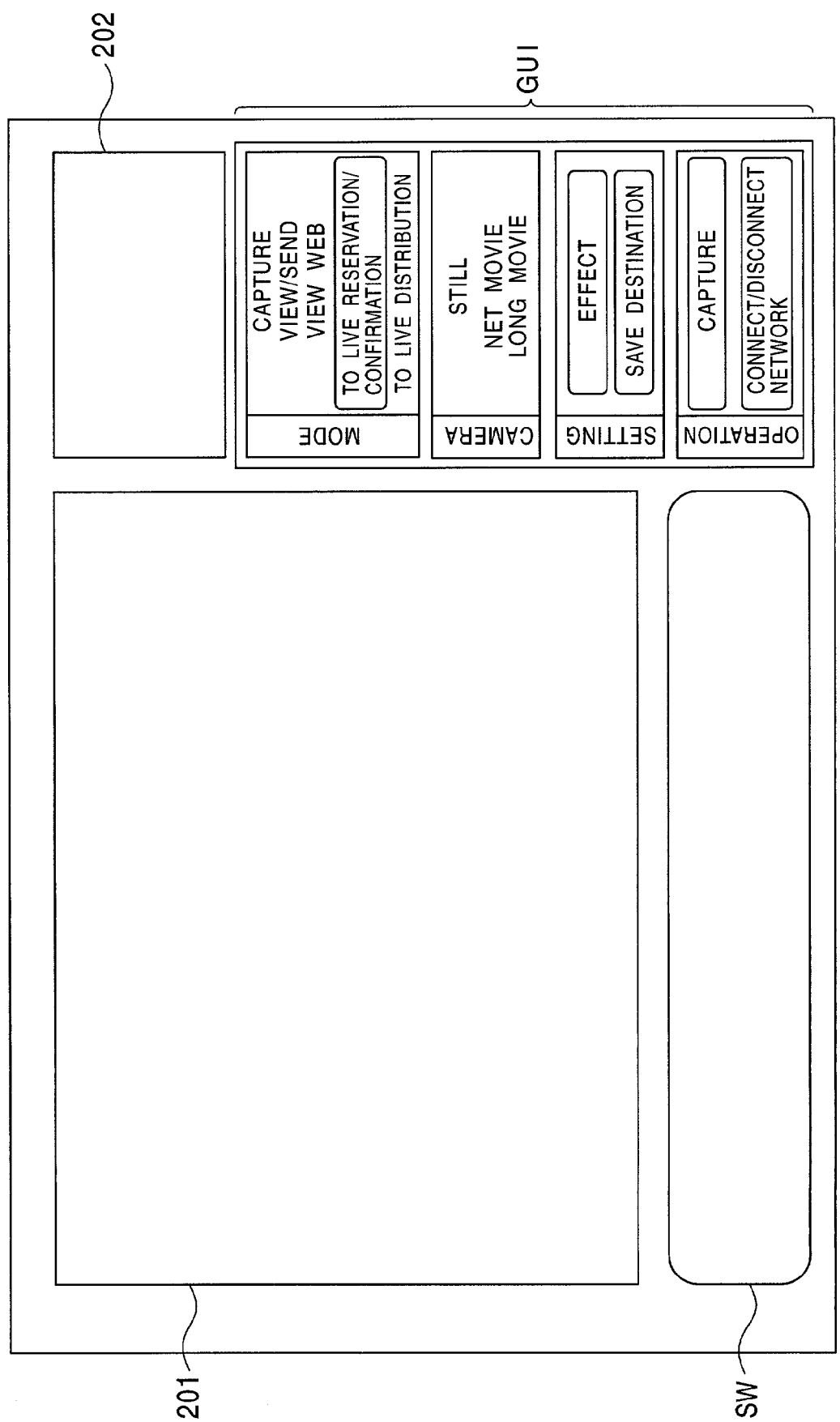
FIG. 8 is a view showing an initial screen displayed on a liquid-crystal screen 24 of the personal computer 3.

More specifically, when the personal computer 3 is turned on, an item "To live reservation/confirmation" on an initial screen like that shown in FIG. 8, displayed on the liquid-crystal screen 24, is selected.

On this initial screen, a main image-display area 201 having a large size for displaying images captured by the digital video camera 26 is provided, and a sub image-display area 202 having a small size for displaying a preview of an image captured last in a previous capturing is provided at the upper right corner of the screen.

Below the sub image-display area 202, a graphic user interface (GUI) for selecting a mode (Mode), a type of images (Camera), a setting (Setting), and an instruction (Operation) is provided. The user can select items on the GUI, if necessary, to select a mode, to select a type of images, such as still images (Still) or moving images (Movie), to change a setting or to input an instruction.

A status window SW is provided below the main image-display area 201.

Figure 9A:
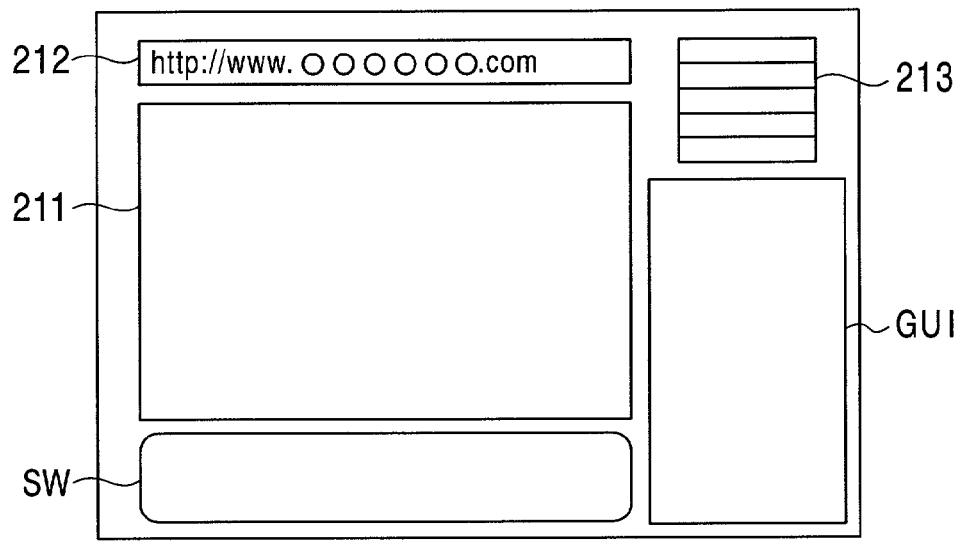
FIG. 9A and FIG. 9B are views of example displays of a live-reservation-mode screen.
Figure 9B:
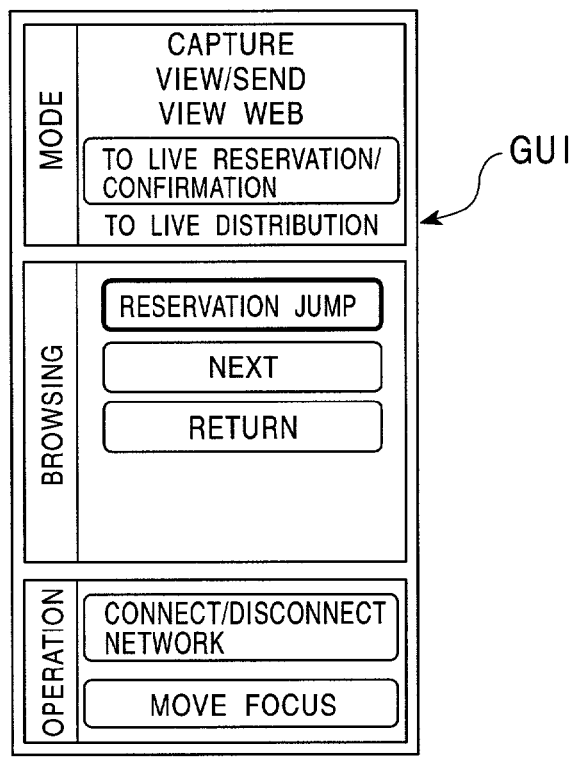

When "To live reservation/confirmation" is selected, a live-reservation-mode screen like that shown in FIG. 9A appears on the liquid-crystal screen 24. Then, an item "Reservation jump" is selected on the GUI as shown in FIG. 9B. According to this operation, the CPU 41 of the personal computer 3 controls the network interface 49 to perform connection processing to the Internet 1 through the telephone network 2 and to send a signal for requesting browsing of a web page for performing a distribution reservation, to the live casting server 7.

In the live-reservation-mode screen, a browser display screen 211 for displaying a web browser, a URL display line 212 for indicating a URL such as that input to display a resource on the browser display screen 211, and a reservation-list display area 213 are provided in addition to the GUI and the status window SW.

The GUI for the live reservation mode includes "Operation," including an item ("Connect/disconnect network") for instructing connection to or disconnection from the Internet and an item ("Move focus) for instructing movement of focus to the browser display screen 211; and "Browsing," including items for browsing instructions, such as "Reservation jump" in addition to "Mode," as shown in FIG. 9B.

To be precise, the CPU 41 controls the network interface 49 to perform signal transmitting and receiving processing in the personal computer 3. In the following description, the transmitting and receiving processing will be described in a simplified manner, such as that in an expression "the personal computer 3 requests browsing of a web page for a distribution reservation, from the live casting server 7" for simplicity. This applies to other apparatuses as well.

Communications between the personal computer 3 and the live casting server 7 are performed through the Internet 1. In the following description, an expression "through the Internet" is appropriately omitted for simplicity. This applies to communications between other apparatuses.

Figure 7:
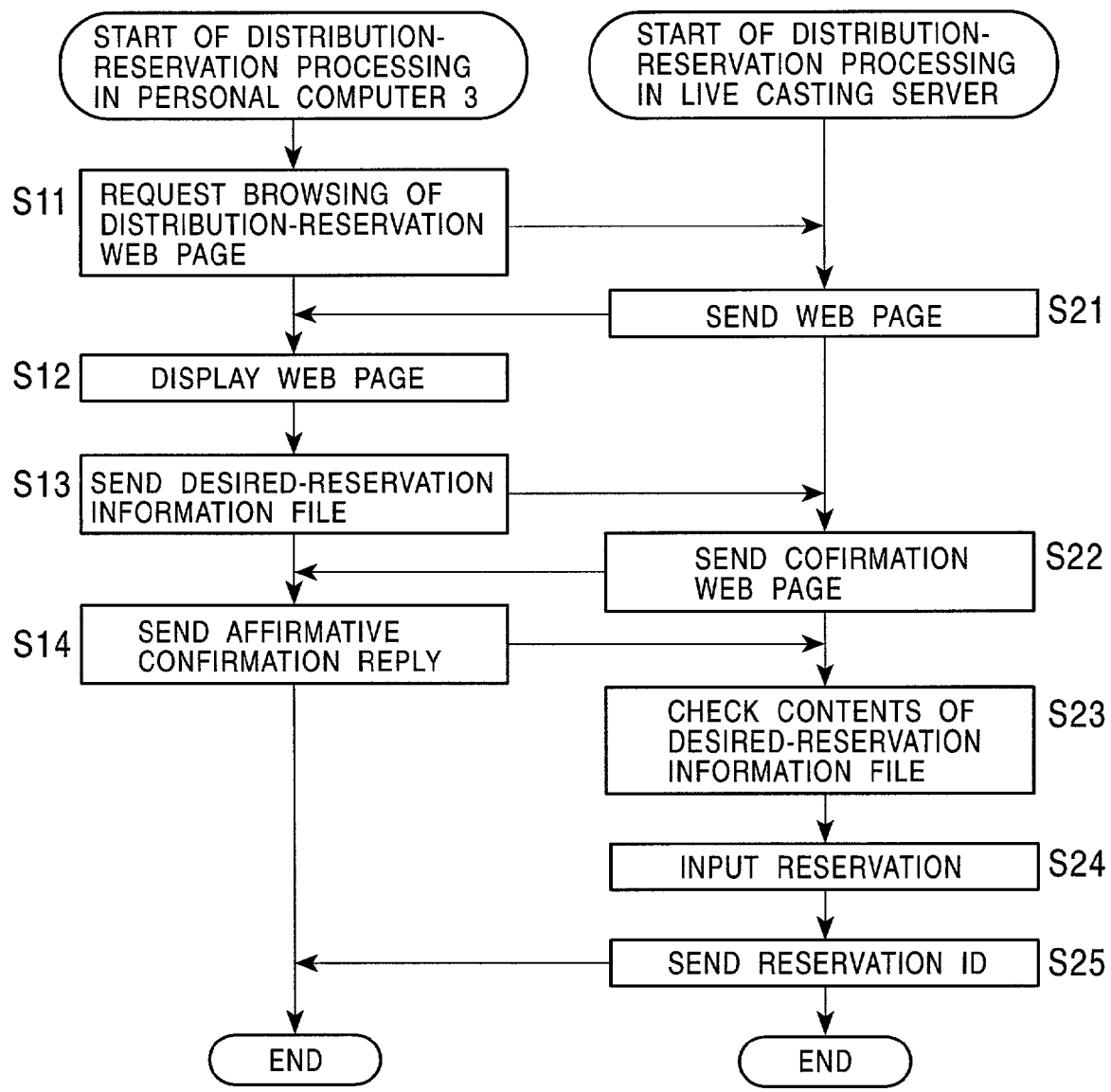
FIG. 7 is a flowchart of details of processing performed in step S1 shown in FIG. 6.

Back to FIG. 7, in step S21, the live casting server 7 sends the web page for a distribution reservation to the personal computer 3.

In step S12, the CPU 41 of the personal computer 3 receives the web page from the live casting server 7, and controls the display interface 48 to display the web page on the liquid-crystal screen 24. In the following description, display processing for the liquid-crystal screen 24 is described in a simplified manner such as that in an expression "the personal computer 3 displays the web page sent from the live casting server 7 on the liquid-crystal screen 24" for simplicity. This applies to other apparatuses.

FIG. 10 shows an example display of the web page for a distribution reservation.

In this display screen, a monthly calendar area 231, a reservation display area 232 for indicating reservation states on the date (fifth in the case shown in FIG. 10) shown in white in a reversed manner in the monthly calendar, a reservation input area 233 for indicating input items and input areas used by the user for a reservation, a Reserve button 234 operated to instruct a reservation, and a Cancel button 235 operated to cancel the contents of inputs made in the reservation input area.

Next, in step S13, the personal computer 3 generates a desired-reservation information file having the same contents as those input in the reservation input area 233, and sends the file to the live casting server 7.

More specifically, the user of the personal computer 3 clicks the date for which a reservation is to be made in the monthly calendar 231 when inputting information into the reservation input area 233. With this, the personal computer 3 displays the clicked date in white in the reversed manner, and requests the provision of reservation states on that date from the live casting server 7.

When the live casting server 7 receives this request, it generates data indicating the reservation states on the date at that point of time by referring to registered contents in the reservation data base 8, and sends the data to the personal computer 3. The personal computer 3 displays the data in the reservation display area 232.

In the reservation display area 232, a capacity for a distribution, a transfer band to be used, a charge, and a reservation state ("full" or "Vacant") for each time slot are displayed for each channel. The user refers to the reservation display area 232 to determine contents to be input to each item in the reservation input area 233. A capacity for a distribution, a transfer band to be used, and a charge are specified in advance for each channel.

Referring to the contents of the reservation display area 232, the user of the personal computer 3 operates the operation section 45 to input information into the reservation input area 233.

The reservation input area 233 includes "Channel" for selecting a channel to be used; "Reservation date and time" for specifying the date and time for a reservation; "Access level"; "Title" for inputting the title of the contents; "Genre" for inputting the genre to which the contents belong; "Access to electronic mail" for determining whether an electronic mail address of the contents supplier (the user of the personal computer 3 in this case) is made public; "Access to web" for determining whether the URL of a web page of the contents supplier (the user of the personal computer 3) is made public; "Password for distribution" for inputting a distribution password of the contents supplier (the user of the personal computer 3), used for authentication performed when the contents are supplied to the streaming server 5; "List of friends"; "Outline" for writing an outline of the contents within a predetermined number of characters (such as 20 characters); and "Details" for writing details of the contents within a predetermined number of characters (such as 200 characters).

"Access level" is the level of an access allowed to the live distribution performed according to the reservation. In other words, this is an item for specifying a restriction on distribution destinations of the live distribution, and one of three levels, "Public," "Password," and "Secret," can be specified.

When "Public" is specified, anyone who can use the live-distribution service can view the live distribution (within the capacity thereof).

When "Password" is specified, only a person(s) who knows a shared password to be input at the same time can view the live distribution.

When "Secret" is specified, only a person(s) who knows a shared password to be input at the same time can view the live distribution in the same way as when "Password" is specified. Whereas a schedule (contents of reservation) of the live distribution is made public when "Password" is selected, a schedule of the live distribution is not made public when "Secret" is selected.

It is assumed in this case that, when "Password" is specified, a shared password determined by the user of the personal computer 3 is input.

At "List of friends," the user inputs electronic-mail addresses of people to whom the live distribution is to be made. Details thereof will be described later, but the live casting server 7 sends various types of information required for receiving the provision of the live distribution, such as the shard password and a reservation ID (described later), to the electronic-mail addresses input in "List of friends" by e-mail. This mail is called notice mail.

In this case, it is assumed that electronic-mail addresses of the users of the personal computers 4-1 to 4-3 are input to "List of friends."

When inputs have been made at items in the reservation input area 233, the user of the personal computer 3 operates the operation section 45 to click the Reserve button 234. According to this operation, the personal computer 3 generates a desired-reservation information file having the same contents as those input to the reservation input area 233, and sends the file to the live casting server 7.

In step S22, the live casting server 7 sends a web page for having the user of the personal computer 3 confirm the contents of the desired-reservation information file sent from the personal computer 3, to the personal computer 3.

In step S14, the personal computer 3 displays the confirmation web page sent from the live casting server 7, on the liquid-crystal screen 24.

FIG. 11 shows an example display of the confirmation web page.

On this display screen, in addition to the contents input in the reservation input area 233 shown in FIG. 10, a charge for the reserved service, and an electronic-mail address (an electronic-mail address input by the user of the personal computer 3 at member registration) to which a reservation-setting information file is to be sent later from the live casting server 7 to the personal computer 3, for example, are displayed.

When the user of the personal computer 3 checks on the confirmation screen shown in FIG. 11 that the reservation contents do not have an error, and manipulates a Confirm button 241, the personal computer 3 sends a message indicating that the reservation contents are correct, to the live casting server 7 according to the manipulation.

The processing performed in the personal computer 3 has been finished.

In step S23, the live casting server 7 determines whether the live distribution can be reserved with the contents of the desired-reservation information file. The live casting server 7 checks, for example, whether there is a missing input and whether there is a vacancy for a desired reservation time slot in a desired channel.

When the user of the personal computer 3 finds an error in the contents of the reservation on the confirmation screen shown in FIG. 11, and manipulates the Cancel button 242, the personal computer 3 sends a message indicating that condition to the live casting server 7 according to the user's manipulation. In this case, the live casting server 7 cancels the desired-reservation information file. Then, the personal computer 3 displays the reservation input screen shown in FIG. 10 again on the liquid-crystal screen 24 to prompt the user to input again.

In step S23, when it is determined that the live distribution can be reserved according to the contents of the desired-reservation information file, the live casting server 7 generates a predetermined reservation ID, and registers a reservation time slot, a channel to be used, a band to be used, mail addresses of persons in the list of friends, a user ID for identifying the user (user of the personal computer 3) who made the reservation, a shared password, and the generated reservation ID according to the contents of the desired-reservation information file, into the reservation data base 8 as shown in FIG. 12, in step S24.

In step S25, the live casting server 7 sends electronic mail, including the reservation ID, to the personal computer 3. With this operation, the processing in the live casting server 7 has been completed, and the processing in step S1 in FIG. 6 is finished.

Next, details of reservation reconfirmation processing in step S2 in FIG. 6 will be described by referring to a flowchart shown in FIG. 13.

The user of the personal computer 3 manipulates the operation dial 29 to select a reservation to be reconfirmed, from the reservation-list display area 213 shown in the screen (screen shown when "To live reservation/confirmation" is selected in FIG. 8) of FIG. 9, which is displayed on the liquid-crystal screen 24.

When the reservation to be reconfirmed has been selected, the personal computer 3 requests browsing of the web page of "My channel" corresponding to the user of the personal computer 3, from the live casting server 7 in step S31.

More specifically, the user of the personal computer 3 first inputs the URL identifying the top page (home page) of the web pages of the live casting server 7 into the personal computer 3. According to this operation, the personal computer 3 requests browsing of the top page of the web pages of the live casting server 7 from the live casting server 7, and displays the web page sent from the live casting server 7 on the browser display screen 211.

FIG. 14 shows an example display of the top page of the web pages of the live casting server 7.

Then, the user of the personal computer 3 inputs the user ID and the password into this display screen to log in, and clicks the link to "My channel." According to this operation, the personal computer 3 requests browsing of the web page of "My channel" corresponding to the user of the personal computer 3, from the list casting serer 7.

Figure 13:
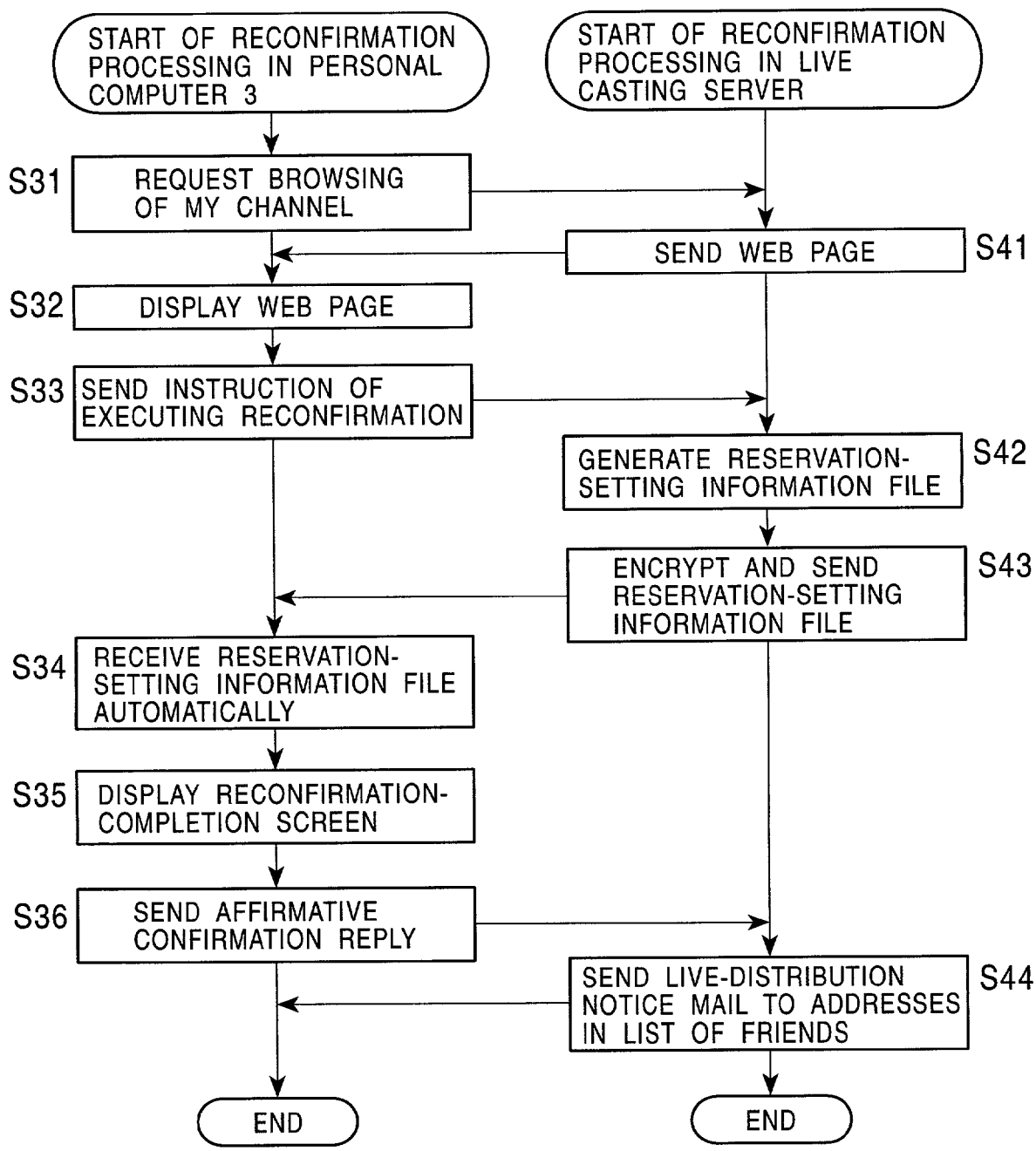
FIG. 13 is a flowchart of processing performed in step S2 shown in FIG. 6.

Back to FIG. 13, in step S41, the live casting server 7 sends the web page of which browsing was requested in step S31, to the personal computer 3.

In step S32, the personal computer 3 displays the web page sent from the live casting server 7, on the browser display screen 211 (shown in FIG. 9).

FIG. 15 shows an example display of the web page of "My channel."

On this display screen, a reservation list 251 indicating the list of reservation items which the user has reserved at the live casting server 7, a link 252 to be operated to jump to a web page for checking the number of viewers for a program which the user distributed in the past, and a link 253 to be operated to jump to a web page for changing the contents of the registered information of the user are displayed.

The reservation list 251 includes "Reservation date and time," "Channel," "Title," a status item for indicating a state, such as a state in which this reservation is "waiting for reconfirmation" to be made or a state in which the reservation "has been reconfirmed," and a "Cancel" link to be operated to instruct a reservation cancellation.

In this case, the status item is set to "Waiting for reconfirmation" as shown in FIG. 15.

In step S33, the personal computer 3 instructs the live casting server 7 to execute reconfirmation.

More specifically, "Waiting for reconfirmation" is clicked in "My channel" shown in FIG. 15. According to this operation, the personal computer 3 requests browsing of a web page for reconfirmation, from the live casting server 7.

The live casting server 7 sends the web page for reconfirmation to the personal computer 3 in response to this request. The personal computer 3 displays the page on the browser display screen 211.

FIG. 16 shows an example display of the web page for reconfirmation.

In this display screen, items registered at reservation setting are displayed, such as "User ID," "Channel," "Reservation date and time," "Access level" (in this case, "Password" is specified and a shared password has been specified), "Title," "Genre," "Access to electronic mail," "Access to web," "Password for distribution," "List of friends" (in this case, addresses of the users of the personal computers 4-1 to 4-3 have been specified), "Outline," and "Details." An area for inputting a reservation ID (ID supplied in step S25 shown in FIG. 7) is also provided in the display screen.

The user of the personal computer 3 inputs the reservation ID, and manipulates a Reconfirmation button 251. According to this manipulation, the personal computer 3 instructs the live casting server 7 to execute reconfirmation.

When the Reconfirmation button 251 is manipulated, setting information for establishing a communication connection to the streaming server 5 is specified in the personal computer 3.

In step S42, the live casting server 7 refers to the reservation data base 8 to generate a reservation-setting information file like that shown in FIG. 17 for this reservation.

The reservation-setting information file includes "Reservation ID," "Live-distribution-reservation date and time," "Server-connection-allowed time," "Telephone number for connection," "Connection-destination server information," "Service-request-destination address information," "Transfer band," "Title," "Outline," "Access level," "Address information for list of friends," and "Shared password."

"Reservation ID" specifies a reservation ID generated by the live casting server 7 at reservation setting. "Live-distribution-reservation date and time" indicates a reserved distribution-start time and a reserved distribution-end time.

"Server-connection-allowed time" indicates a time slot for which a connection to the streaming server 5 is allowed in order to supply contents to be live-distributed. In this case, a connection to the streaming server 5 is allowed from five minutes before the live-distribution start time to five minutes after the distribution end time.

"Telephone number for connection" specifies the telephone number of an access port of the server-connection network 10 for connecting to the streaming server 5. In this case, the telephone numbers of access ports of four telecommunication business parties are described. To connect to the server-connection network 10, processing for making a call to the telephone number of an access port of any of the telecommunication business parties, selected by the user of the personal computer 3, is performed.

"Connection-destination server information" is determined according to the channel selected in the reservation, and includes information such as "Server type," "Server name," "Connection port," and "Stream path to server." When a communication connection is established between the personal computer 3 and an access port of the server-connection network 10, connection processing for using the reserved channel in the streaming server 5 is performed according to the contents specified in "Connection-destination server information."

"Service-request-destination address information" indicates URL information used when a personal computer 4 receives the provision of the live distribution reserved by the personal computer 3 or when a personal computer 4 uses a chat space corresponding to the reservation.

"Transfer band" indicates information determined according to the reserved channel, and includes transfer-band information specified in advance for the reserved channel, such as 64 kbps or 28.8 kbps.

"Title," "Outline," and "Access level" includes contents registered at the reservation. "Address information for list of friends" indicates an electronic-mail address (addresses of the users of the personal computers 4-1 to 4-3, in this case) registered at the reservation.

"Shared password" indicates a shared password registered at the reservation.

When the personal computer 3 instructs execution of reconfirmation if six hours have elapsed from the reserved distribution start time, the live casting server 7 sends a web page for displaying a message such as "Since reconfirmation was not executed, your reservation was canceled. To make a reservation, follow a distribution reservation procedure again," to the personal computer 3.

In step S43, the live casting server 7 encrypts the generated reservation-setting information file by using an encryption method such as the Data Encryption Standard (DES), and sends it together with a web page for displaying a reconfirmation completion screen, to the personal computer 3.

In step S34, the personal computer 3 receives the web page and the encrypted reservation-setting information file from the live casting server 7, decrypts the reservation-setting information file by using a description of "Active X," and stores the file at a predetermined area in the hard disk 44 according to a command included in the file.

In step S35, the personal computer 3 displays the reconfirmation completion screen on the browser display screen 211 (shown in FIG. 9).

When the user of the personal computer 3 checks the contents of the displayed reconfirmation completion screen and then performs a predetermined operation, the personal computer 3 sends a message indicating that the contents have been checked to the live casting server 7 in step S36. Then, the processing in the personal computer 3 is finished.

In step S44, the live casting server 7 refers to the reservation data base 8 to send electronic mail (notice mail) indicating that the live distribution is to be performed to electronic-mail addresses registered in the list of friends for this reservation.

FIG. 18 shows contents displayed on the display section of a personal computer 4 when the notice mail is opened.

The electronic mail includes information such as "Live-distribution date and time," "Title," "Outline," "Service-request-destination address" (having the same contents as the service-request-destination address information shown in FIG. 17) "Shared password," and "reservation ID."

Figure 6:
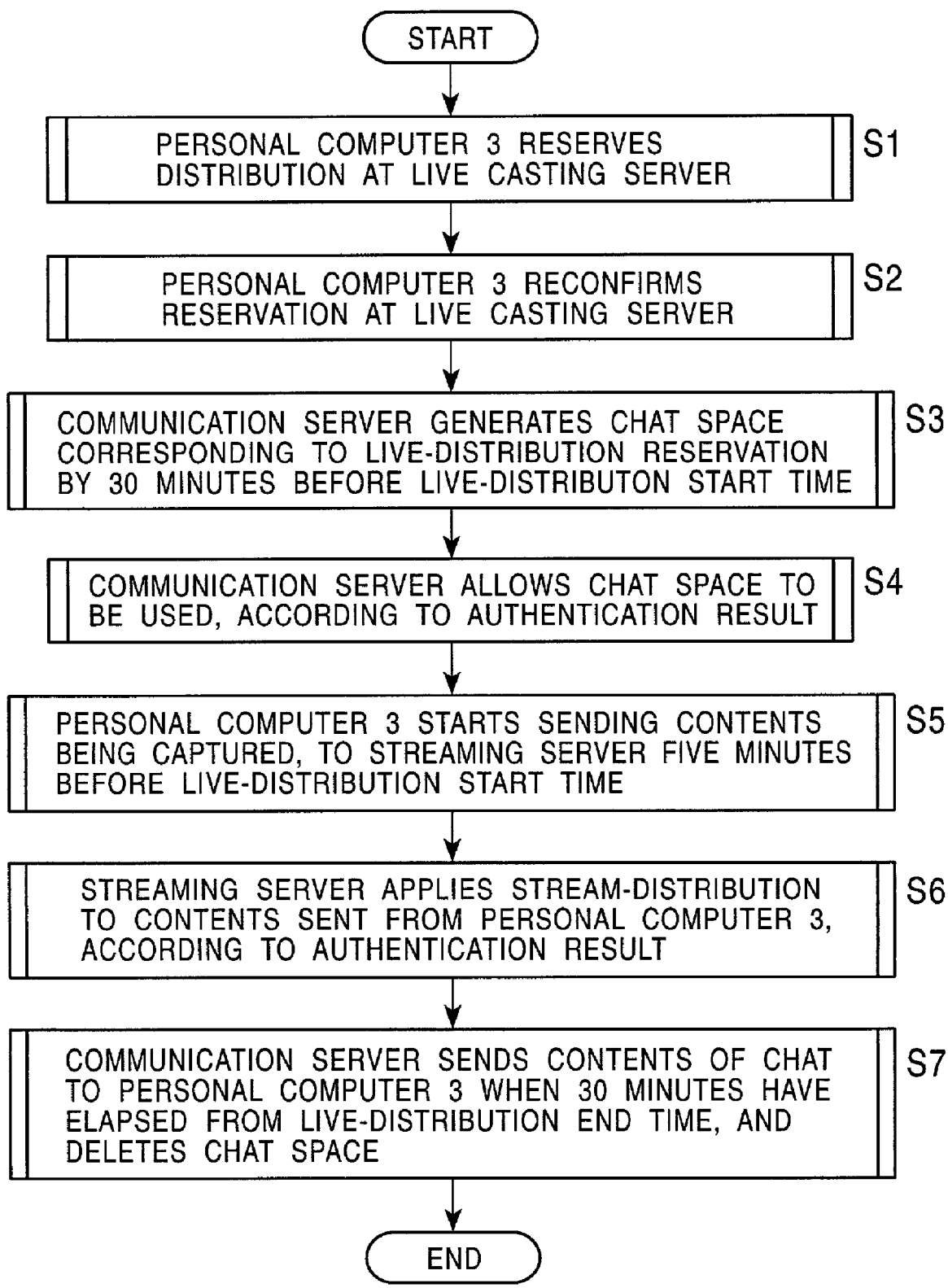
FIG. 6 is a flowchart of an operation of the service providing system according to the embodiment of the present invention.

Then, the processing in the live casting server 7 is finished, and the processing of step S2 of FIG. 6 is terminated.

Next, details of chat-space generation processing performed in step S3 of FIG. 6 will be described by referring to a flowchart shown in FIG. 19.

In step S51, the reservation data base 8 waits until it is determined according to the registered information (shown in FIG. 12) that there is a reserved live distribution starting when a predetermined time (30 minutes in this case) elapses from the current time. When it is determined that there is such a reserved live distribution, the processing proceeds to step S52.

In step S52, the reservation data base 8 reports to the communication server 6 that there is a reserved live distribution starting 30 minutes later.

In step S53, the communication server 6 generates a shared file as a chat space corresponding to the reservation of the live distribution, reported from the reservation data base 8.

Then, the processing is terminated.

Next, processing for providing a chat space, performed in step S4 of FIG. 6 will be described by referring to FIG. 20. A case in which the personal computer 4-1 requests the use of a chat space will be taken as an example.

In step S61, the personal computer 4-1 requests browsing of a web page for displaying detailed information of the live distribution reserved by the personal computer 3, from the live casting server 7.

More specifically, the user of the personal computer 4-1 manipulates the link of "Service-request-destination address" indicated in the notice mail (FIG. 18) sent from the live casting server 7. According to this manipulation, the personal computer 4-1 requests browsing of the web page for displaying detailed information of the live distribution reserved by the personal computer 3, from the live casting server 7.

In step S62, the live casting server 7 sends the requested web page to the personal computer 4-1.

In step S63, the personal computer 4-1 displays the web page sent from the live casting server 7 on the display section.

FIG. 21 shows an example display of the web page for displaying detailed information of the live distribution reserved by the personal computer 3.

In step S64, the personal computer 4-1 sends the shared password and a request for using a chat space to the communication server 6.

More specifically, the user of the personal computer 41 inputs the shared password indicated in the notice mail into the display screen shown in FIG. 21, and manipulates the Chat button 262. According to this manipulation, the personal computer 4-1 sends the shared password and the request for using a chat space to the communication server 6.

In step S65, the communication server 6 authenticates the personal computer 4-1 according to the shard password sent from the personal computer 4-1.

More specifically, the communication server 6 sends the shared password sent from the personal computer 4-1, to the reservation data base 8. The reservation data base 8 determines whether the received shared password has been registered as information (FIG. 12) related to the reservation made by the personal computer 3, and sends a result of determination to the communication server 6.

The communication server 6 authenticates the personal computer 4-1 according to the result of determination sent from the reservation data base 8.

In step S66, the communication sever 6 determines according to the result of authentication performed in step S65 whether it is possible to allow the personal computer 41 to use the chat space corresponding to the reservation of the live distribution, made by the personal computer 3. When it is determined that it is possible to allow (when the shared password sent from the personal computer 4-1 has been registered in the reservation data base 8), the processing proceeds to step S67, and the communication server 6 connects the personal computer 4-1 to the shared file corresponding to the reservation of the live distribution, made by the personal computer 3.

Figure 22:
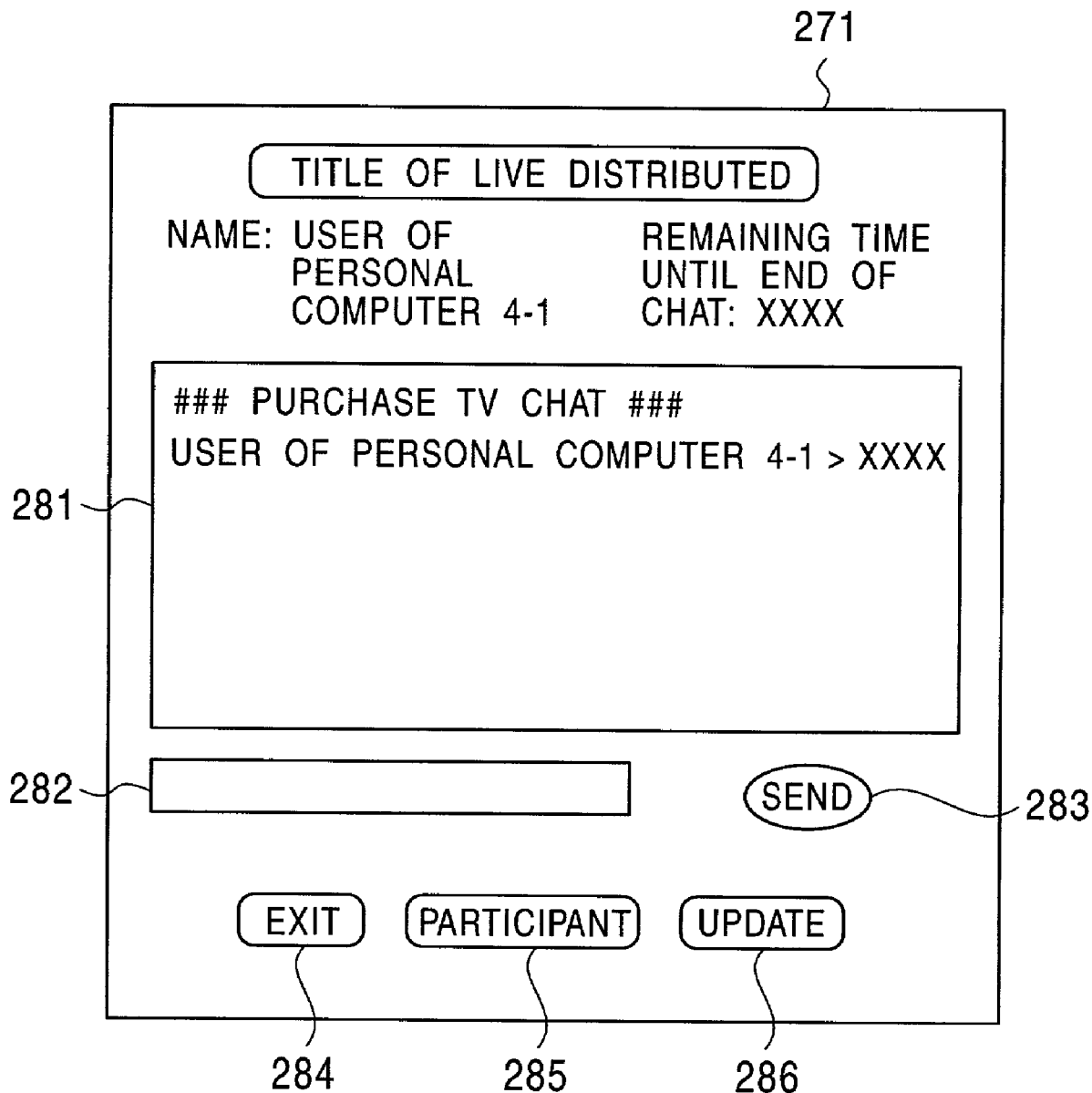
FIG. 22 is a view showing an example display of a chat display screen.

When the personal computer 4-1 is connected to the shared file corresponding to the reservation of the live distribution, made by the personal computer 3 in this way, a chat display screen 271 like that shown in FIG. 22 is displayed in the display section of the personal computer 4-1.

The chat display screen 271 includes an area 281 for displaying the contents of chatting and an input area 282 for inputting a chat text, and in addition, a Send button 283 manipulated when the chat text input in the input area 282 is sent to the communication server 6, an Exit button 284 manipulated when a connection to the communication server 6 is disconnected, a Participant button 285, and an Update button 286.

On the chat display screen 271, the title of the live distribution reserved by the personal computer 3, the name of the user of the personal computer 4-1, and the remaining time (a period from the current time to the time 30 minutes after the live-distribution end time) until the end of chatting are also displayed.

Next, in step S68, the communication server 6 performs processing corresponding to a manipulation of the user of the personal computer 4-1 on the chat display screen 271.

When a chat text is input in the input area 282 and the Send button 283 is manipulated to send the chat text from the personal computer 4-1, for example, the communication server 6 writes the text into the shared file. With this operation, the user (for example, the user of the personal computer 3 and the user of the personal computer 4-2) of a personal computer, who has been using the chat space corresponding to the reservation of the live distribution, made by the personal computer 3 can see the contents of the text.

Figure 23:
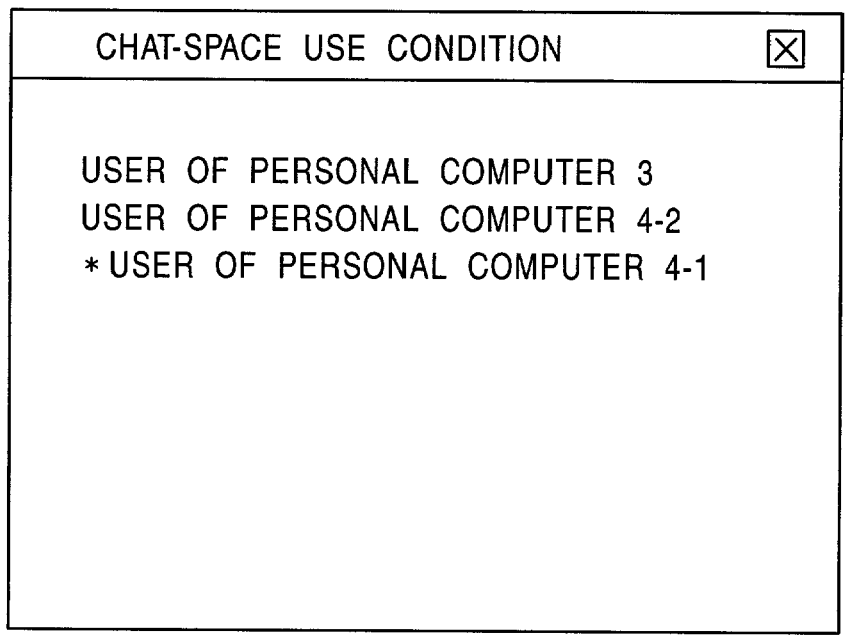
FIG. 23 is a view showing a display screen illustrated when a Participant button on the chat display screen is manipulated.

When the Participant button 285 is manipulated and a message indicating that the button has been manipulated is sent, the communication server 6 sends to the personal computer 4-1, for example, a message indicating that the users of the personal computer 3 and the personal computer 4-2 have been using the chat space corresponding to the reservation of the live distribution, made by the personal computer 3. Then, the personal computer 4-1 displays the names of the users of the personal computers 3, 4-1, and 4-2 as persons who are using the chat space corresponding to the reservation of the live distribution, made by the personal computer 3, as shown in FIG. 23. An asterisk (*) is attached to the name of the user who manipulated the Participant button (in this case, the user of the personal computer 4-1).

Figure 24:
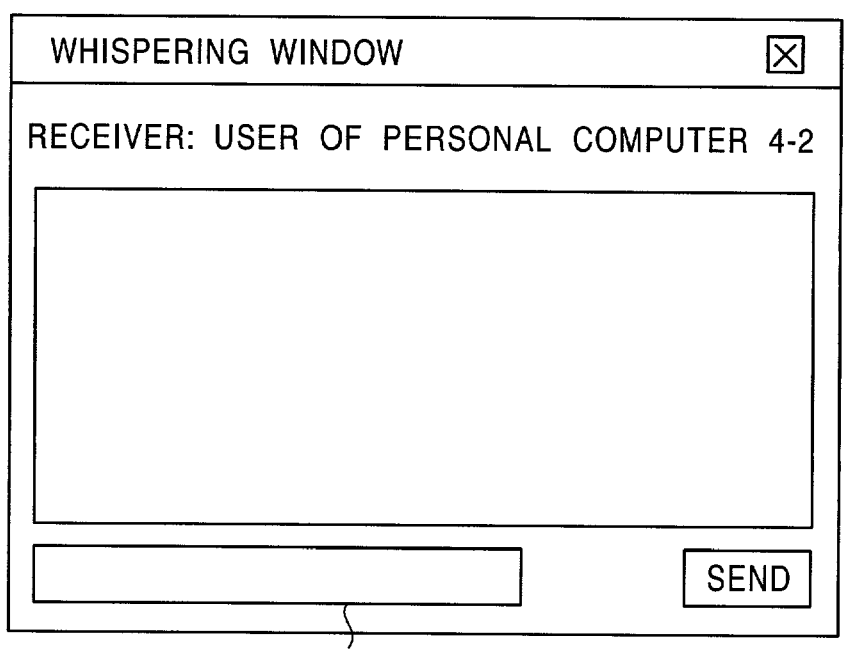
FIG. 24 is a view showing a display screen illustrated when the Participant button on the chat display screen is manipulated.

When a user (for example, the user of the personal computer 4-2) indicated in FIG. 23 is selected, a message can be directly (without being made public to the other users) sent to the user. A screen like that shown in FIG. 24 is displayed on the display section of the personal computer 4-1. The user of the personal computer 4-1 can input a chat text in an input area 291 on the screen and manipulate a Send button 292 to send the text only to (to chat only with) the user of the personal computer 4-2.

Figure 20:
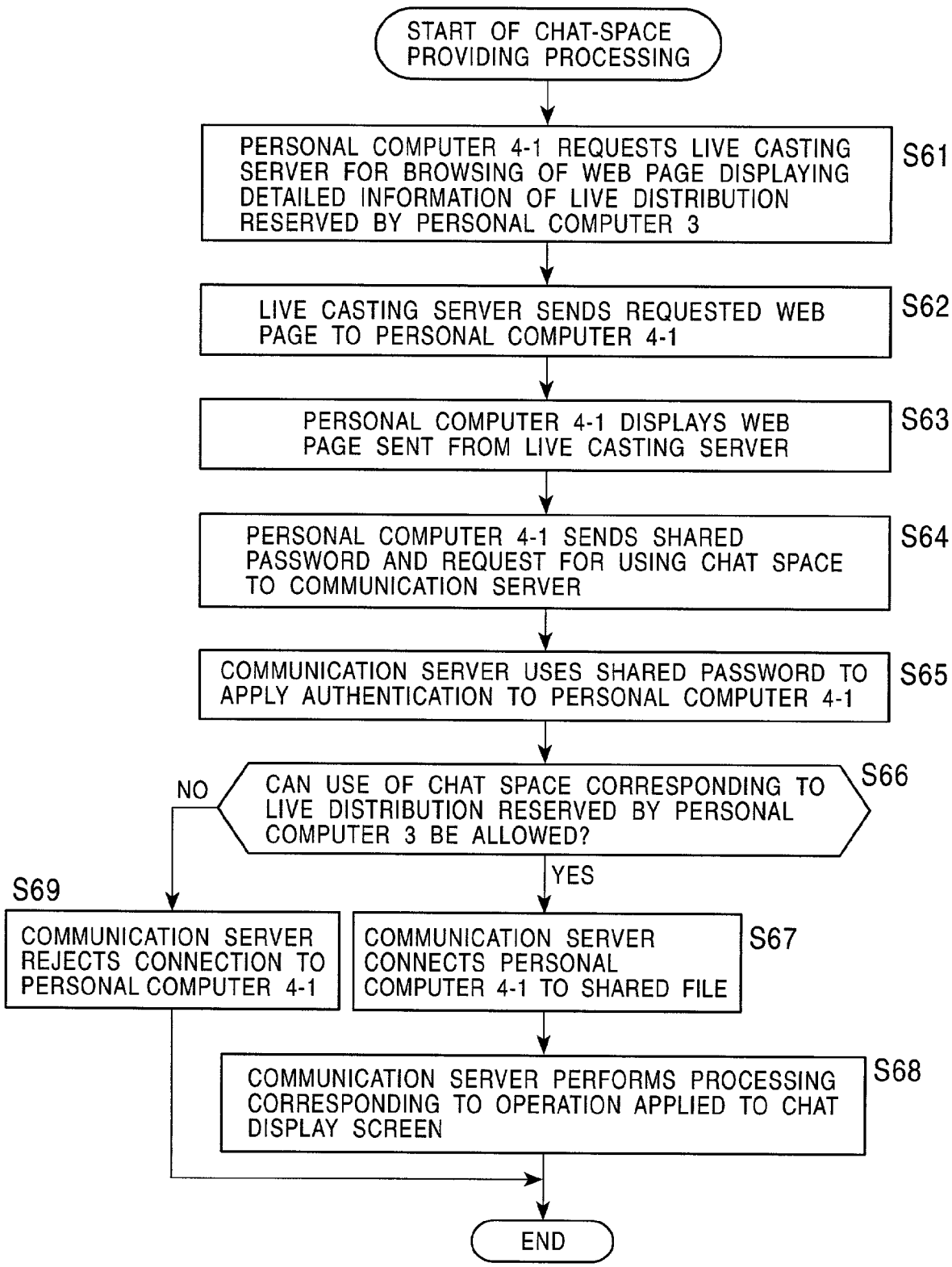
FIG. 20 is a flowchart of details of processing performed in step S4 shown in FIG. 6.

Back to FIG. 20, when it is determined in step S66 that the use of the chat space corresponding to the reservation of the live distribution, made by the personal computer 3 cannot be allowed (that the shared password sent from the personal computer 4-1 has not been registered in the reservation data base 8), the processing proceeds to step S69, and the communication server 6 rejects a connection to the personal computer 4-1.

After the process of step S68 or step S69, the processing of step S4 in FIG. 6 is finished.

Figure 25:
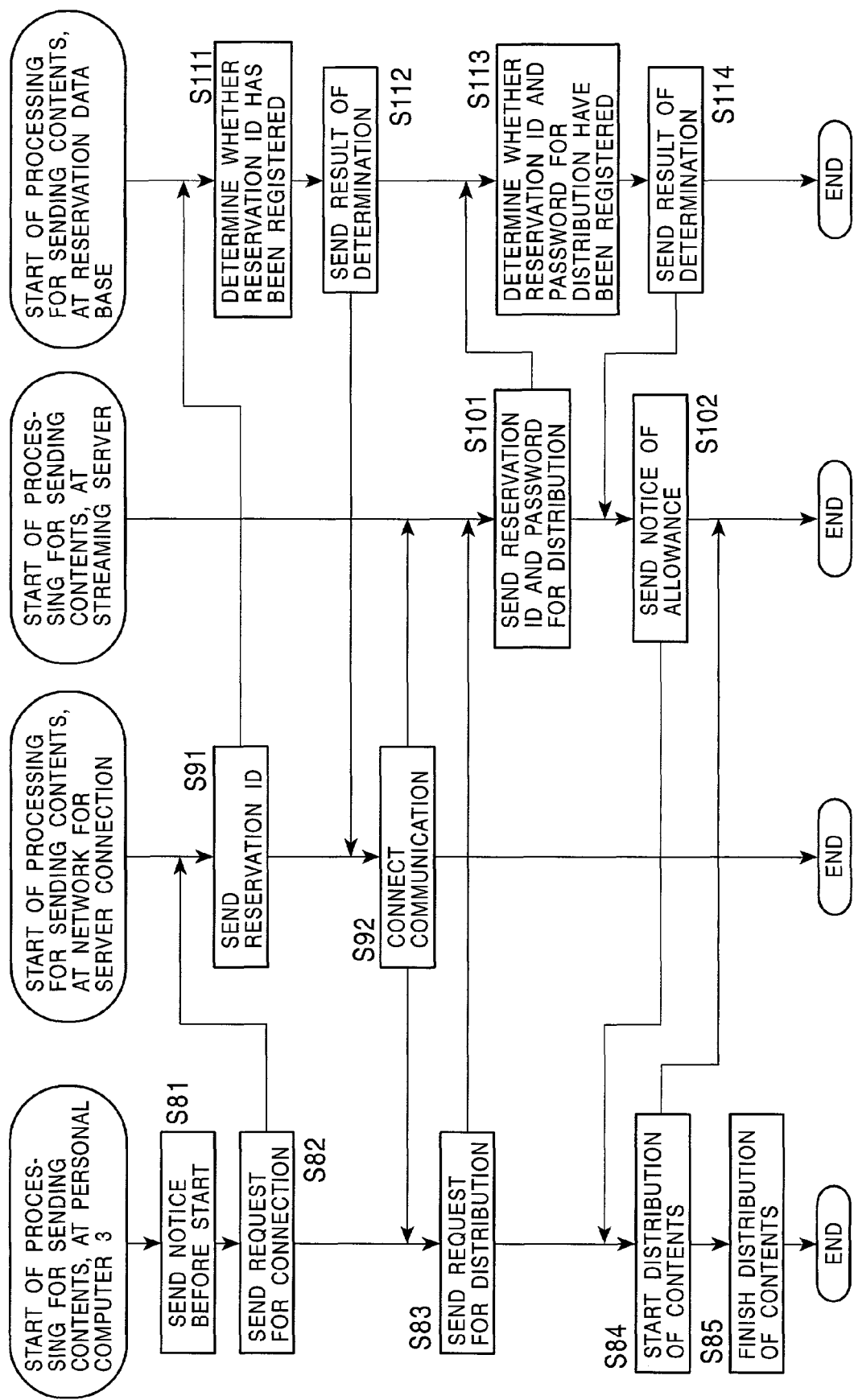
FIG. 25 is a flowchart of details of processing performed in step S5 shown in FIG. 6.

Details of processing for supplying live-distribution contents, performed in step S5 of FIG. 6 will be described next by referring to a flowchart shown in FIG. 25.

In step S81, the personal computer 3 sends a message indicating "the live distribution will start soon" to the personal computer 4 a predetermined time (10 minutes, for example) before the start time of the live distribution reserved. With this operation, the message is displayed in a personal computer 4, and the user of the personal computer 4 can understand that the live distribution will start soon.

Next, when the time at which a connection to the streaming server 5 is allowed comes, the personal computer 3 starts processing for connecting to the streaming server 5. More specifically, in step S82, the personal computer 3 obtains the telephone number of an access port of the telecommunication business party specified in advance by the user of the personal computer 3, by referring to "Telephone number for connection" in the reservation-setting information file (shown in FIG. 17) and performs processing for making a call at the telephone number. Then, the personal computer 3 sends the reservation ID to an access server of the server-connection network 10 to request a communication connection.

In step S91, the access server of the server-connection network 10 sends the reservation ID sent from the personal computer 3, to the reservation data base 8 through the live casting server 7.

In step S111, the reservation data base 8 determines whether the reservation ID sent from the server-connection network 10 has been registered as information related to the reservation of the live distribution, made by the personal computer 3. In step S112, the reservation data base 8 sends a result of determination to the access server of the server-connection network 10.

In step S92, the access server of the server-connection network 10 authenticates the personal computer 3 according to the result of determination sent from the reservation data base 8, and determines according to a result of authentication whether the personal computer 3 is allowed to be connected to the streaming server 5. When it is determined that the personal computer 3 is allowed to be connected to the streaming server 5 (when the reservation ID sent from the personal computer 3 has been registered in the reservation data base 8), the access server of the server-connection network 10 allows a connection to be made between the personal computer 3 and the streaming server 5. With these operations, a communication connection between both units is established.

When it is determined that the personal computer 3 is not allowed to be connected to the streaming server 5 (when the reservation ID sent from the personal computer 3 has not been registered in the reservation data base 8), the access server of the server-connection network 10 does not allow a connection to be made between the personal computer 3 and the streaming server 5, and disconnects the call made by the personal computer 3. Then, the processing at the access server of the server-connection network 10 is finished.

When a communication connection is made between the personal computer 3 and the streaming server 5, the personal computer 3 sends the reservation ID and the password for distribution to the streaming server 5 to request the supply of contents for the live distribution in step S83.

In step S101, the streaming server 5 receives the reservation ID and the password for distribution from the personal computer 3, and sends them to the reservation data base 8.

In step S113, the reservation data base 8 determines whether the reservation ID and the password for distribution sent from the streaming server 5 have been registered as information related to the reservation of the live distribution, made by the personal computer 3. In step S114, the reservation data base 8 sends a result of determination to the streaming server 5. Then, the processing at the reservation data base 8 is finished.

In step S102, the streaming server 5 authenticates the personal computer 3 according to the result of determination sent from the reservation data base 8, and determines according to a result of authentication whether the contents are allowed to be supplied. When it is determined that the contents are allowed to be supplied (when the reservation ID and the password for distribution sent from the personal computer 3 have been registered in the reservation data base 8), the streaming server 5 sends a result of determination to the personal computer 3. The streaming server 5 obtains information registered at the reservation, such as the reserved time slot and the reserved channel, from the reservation data base 8, and controls the live distribution to be made. Then, the processing at the streaming server 5 is finished.

In step S84, the personal computer 3 sends moving-image data corresponding to captured video to the streaming server 5 in real time through the server-connection network 10.

Since the personal computer 3 displays a message indicating that the contents are allowed to be supplied on the liquid-crystal screen 24 when the contents are allowed to be supplied, the user of the personal computer 3 manipulates, for example, an operation button 27 or the operation dial 29 to start capturing images by the digital video camera 26 and to instruct the start of the live distribution.

The streaming server 5 receives the contents from the personal computer 5 and then distributes them to a personal computer 4 which indicates a request. This processing will be described later.

In step S85, when the reservation end time comes, or when a manipulation for terminating the live distribution is performed on the operation section 45 of the personal computer 3, the personal computer 3 terminates transmission of the contents, and disconnects a connection from the streaming server 5.

Then, the processing at the personal computer 3 is finished, and the processing of step 5 of FIG. 6 is completed.

Figure 26:
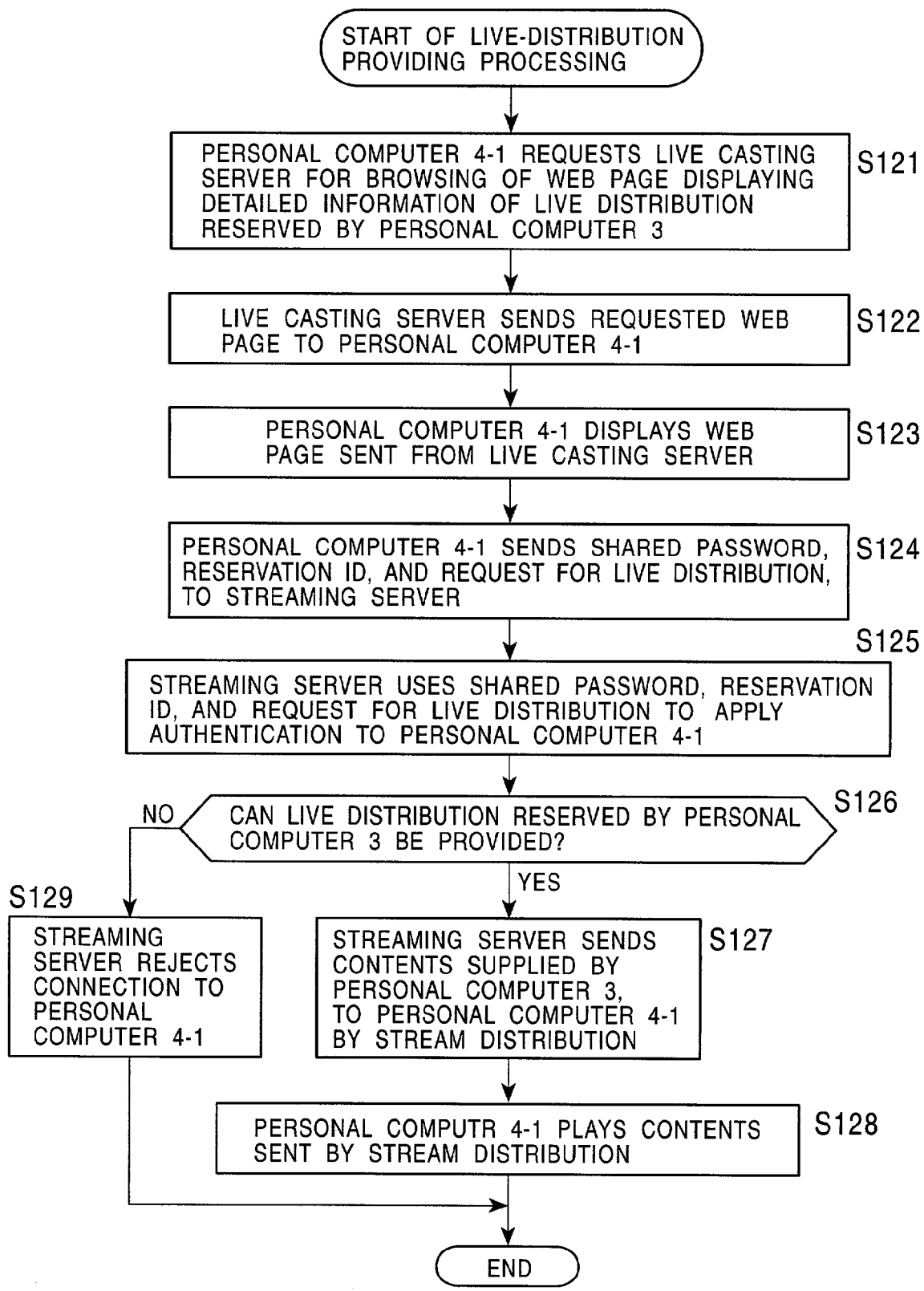
FIG. 26 is a flowchart of details of processing performed in step S6 shown in FIG. 6.

Next, details of processing for providing live distribution for a personal computer 4, performed in step s6 of FIG. 6 will be described by referring to a flowchart shown in FIG. 26. A case in which the personal computer 4-1 requests the provision of live distribution is taken as an example.

Since the same processes as those in steps S61 to S63 of FIG. 20 are performed in steps S121 to S123, detailed descriptions thereof are omitted. With these processes, the web page indicating detailed information of the live distribution reserved by the personal computer 3, shown in FIG. 21, is displayed on the display section of the personal computer 4-1.

In step S124, the personal computer 4-1 sends the shared password, the reservation ID, and a request for the provision of the live distribution reserved by the personal computer 3, to the streaming server 5.

More specifically, the user of the personal computer 41 inputs the shared password and the reservation ID indicated in the notice mail (shown in FIG. 18) in the display screen shown in FIG. 21, and manipulates a Play button 261. According to this manipulation, the personal computer 4-1 sends the input shared password, the input reservation ID, and a request for the provision of the live distribution reserved by the personal computer 3, to the streaming server 5.

In step S125, the streaming server 5 authenticates the personal computer 4-1 according to the shared password and the reservation ID sent from the personal computer 4-1.

More specifically, the streaming server 5 sends the shared password and the reservation ID sent from the personal computer 4-1, to the reservation data base 8. The reservation data base 8 determines whether the received shared password and the received reservation ID have been registered as information related to the reservation made by the personal computer 3, and sends a result of determination to the streaming server 5.

The streaming server 5 authenticates the personal computer 4-1 according to the result of determination sent from the reserved data base 8.

In step S126, the streaming server 5 determines according to the result of authentication performed in step S125 whether it is possible to provide the personal computer 4-1 with the live distribution reserved by the personal computer 3. When it is determined that it is possible to provide, the processing proceeds to step S127, and the streaming server 5 stream-distributes the contents supplied by the personal computer 3, to the personal computer 4-1.

Figure 27:
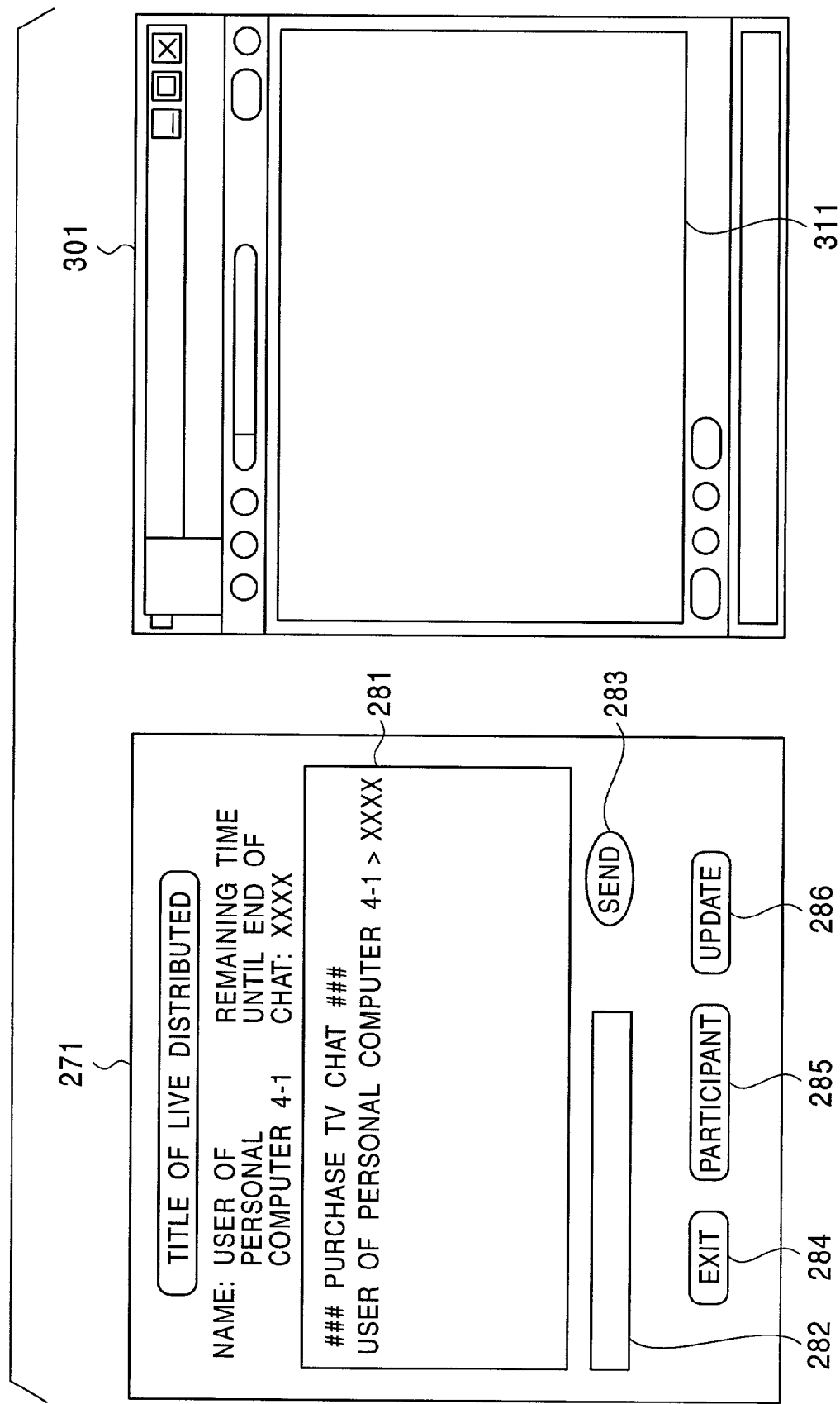
FIG. 27 is a view showing a state in which the chat display screen and a play display screen are displayed.

In step S128, the personal computer 4-1 displays a play (reproduction) display screen 301 next to the chat display screen 271 displayed by the process of step S67 in FIG. 20, as shown in FIG. 27, and plays (reproduces) the stream-distributed contents in a play (reproduction) area 311 of the play display screen 301 in real time.

When it is determined in step S126 that it is not possible to provide the live distribution reserved by the personal computer 3, the processing proceeds to step S129, and the streaming server 5 rejects a connection to the personal computer 4-1.

After the process of step S128 or step S129, the processing of step S6 in FIG. 6 is finished.

Figure 28:
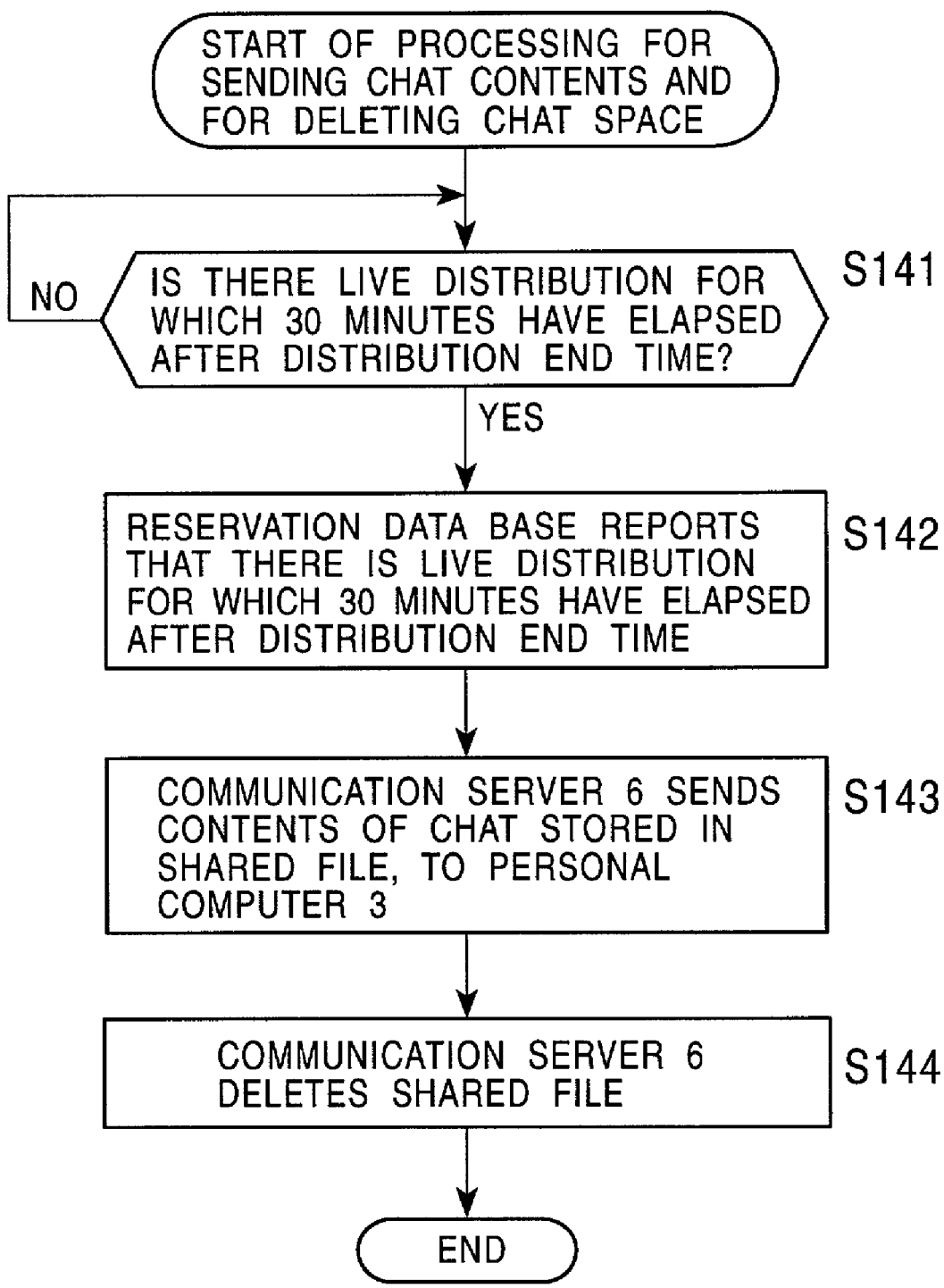
FIG. 28 is a flowchart of details of processing performed in step S7 shown in FIG. 6.

Processing for sending chat contents and for deleting a chat space, performed in step S7 of FIG. 6 will be described next by referring to a flowchart shown in FIG. 28.

In step S141, the reservation data base 8 waits until it is determined according to the registered information (shown in FIG. 12) that there is a reserved live distribution for which a predetermined time (30 minutes, for example) has elapsed from the live-distribution end time. When it is determined that there is such a reserved live distribution, the processing proceeds to step S142.

In step S142, the reservation data base 8 reports to the communication server 6 that there is a reserved live distribution for which 30 minutes have elapsed from the live-distribution end time.

In step S143, the communication server 6 sends the contents (the whole or a part thereof) of chatting stored in the shared file generated in step S53 of FIG. 19, to the personal computer 3. With this operation, the user of the personal computer 3 can later check the contents of chatting concerning the live distribution which the user performed.

In step S144, the communication server 6 deletes the shared file generated in step S53 of FIG. 19. With this operation, the chat space corresponding to the reservation of the live distribution, made by the personal computer 3, disappears.

Then, the processing is terminated.

In the foregoing description, the live casting server 7 sends a notice message to a personal computer 4. The personal computer 3, which provides contents, may send it.

In the foregoing description, the streaming server 5 uses a reservation ID in addition to a shared password for authentication. Instead of a reservation ID, a user ID may be used. Only a shared password may be used in authentication.

Figure 29:
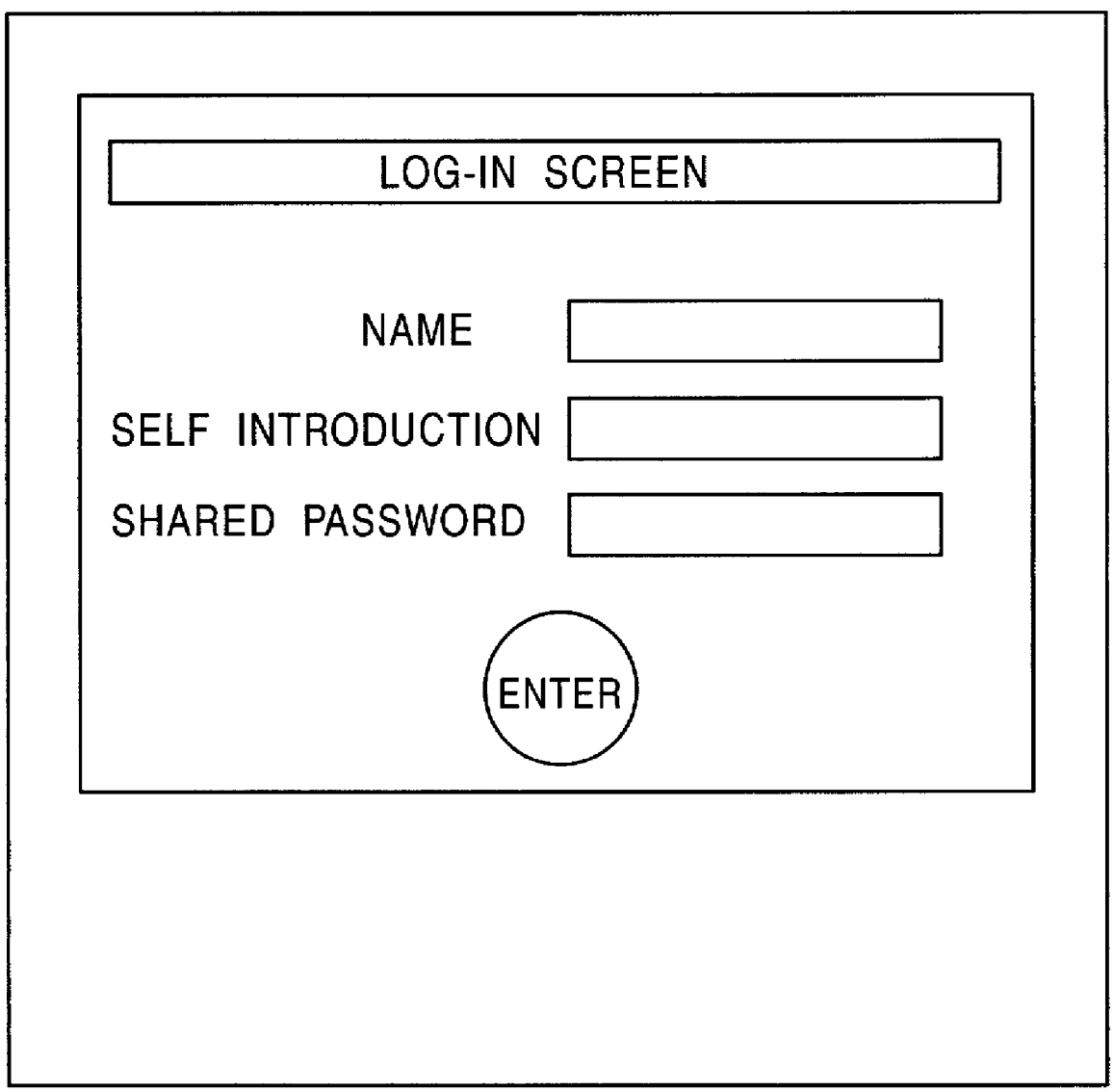
FIG. 29 is a view of a log-in screen.

In the foregoing description, the user of a personal computer 4 logs in the streaming server 5 and the communication server 6 by the use of the web page (shown in FIG. 21) for displaying detailed information of the live distribution reserved by the personal computer 3. To log in the communication server 6, for example, a log-in screen like that shown in FIG. 29 may be displayed to prompt the user of the personal computer 4 to input the name of the user, self introduction, and a shared password.

Figure 30:
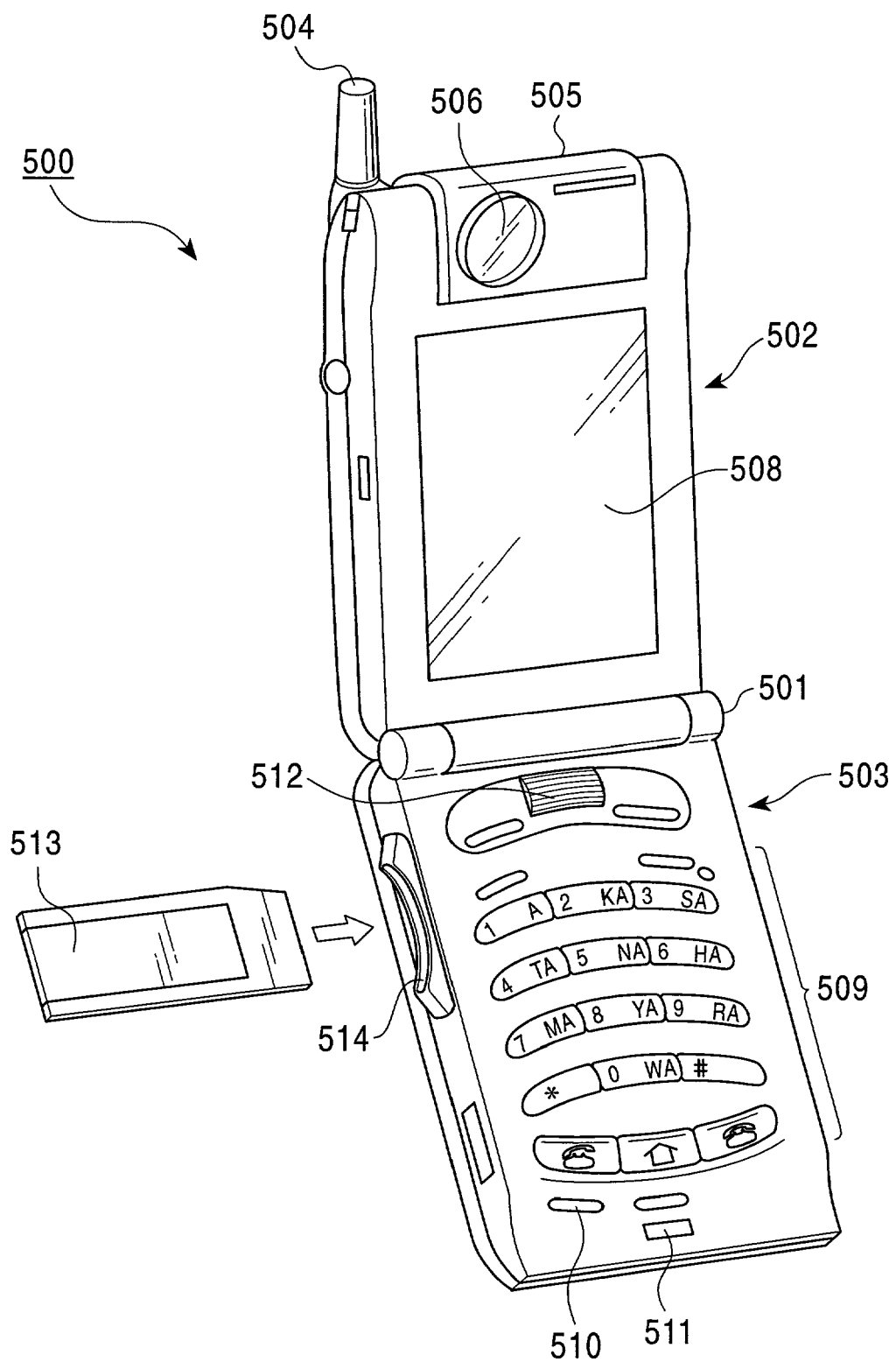
FIG. 30 is a view showing an example appearance of a portable telephone 500.

In the foregoing description, a personal computer provides contents, and personal computers serve as viewer terminals. As shown in FIG. 30, a portable telephone 500 may be used.

The portable telephone 500 is divided into a display section 502 and a body 503 with a hinge section 501 disposed therebetween, and can be folded at the hinge section 501.

The display section 502 is provided with a transmission and receiving antenna 504 at an upper left portion in an extension and retraction possible manner, and transmits and receives an electromagnetic wave to and from a base station (not shown) through the antenna 504.

The display section 502 is also provided with a camera section 505 rotatable within the range of angles of around 180 degrees, at an upper center portion. A CCD camera 506 of the camera section 505 can capture a desired subject.

The display section 502 is further provided with a liquid-crystal display 508 at a surface, and can display a receiving condition of electromagnetic waves, the remaining amount of battery, the names and telephone numbers of persons input in a telephone book, a transmission history, the contents of electronic mail, simplified home pages, images captured by the CCD camera 506 of the camera section 505, and others.

The body 503 is provided with operation keys 509 on its upper surface, such as numeric keys "0" to "9," a making-a-call key, a redial key, a termination and power key, a clear key, and an electronic-mail key. With the use of the operation keys 509, various instructions can be input.

The body section 503 is also provided with a memory button 510 and a microphone 511 below the operation keys 509. Voice can be recorded during a call by the use of the memory button, and voice of the user can be obtained during a call by the microphone 511.

In addition, the body section 503 is provided with a rotatable jog dial 512 above the operation keys in a state in which the jog dial slightly protrudes from the surface of the body section 503. According to a rotation operation of the jog dial 512, a list or electronic mail displayed on the liquid-crystal display 508 is scrolled, a simplified home page is scrolled, and an image is fed.

The body section 503 is further provided with a memory-stick slot 514 for loading a detachable memory stick (trademark) 513, at an upper portion of the left side face. When the memory button 510 is pressed, voice of the other party can be recorded into the memory stick 513 during a call, or electronic mail, a simplified home page, or an image captured by the CCD camera 506 can be recorded according to an operation of the user.

The above-described series of processing can be executed not only by hardware but also by software. When the series of processing is executed by software, a program constituting the software is installed from a program recording medium to a computer built in special hardware, or to an apparatus which can execute various functions by installing various programs, such as a general-purpose personal computer.

The recording medium can be a package medium which is distributed separately from a computer to provide the user with the program and in which the program is recorded, such as the magnetic disk 111 (including a floppy disk), the optical disk 112 (including compact disk read only memory (CD-ROM) and a digital versatile disk (DVD)), the magneto-optical disk 113 (including a Mini disk (MD)), or the semiconductor memory 114. In addition, the recording medium can be a device in which the program is recorded and which is provided for the user in a condition in which it is built in a computer in advance, such as the ROM 92 or the hard-disk drive 94.

In the present specification, steps describing the program provided by a medium include not only processing to be executed in a time-sequential manner in a described order but processing which is not necessarily executed time-sequentially but is executed in parallel or independently.

In the present specification, a system refers to the entire apparatus formed of a plurality of units.

What is claimed is:

1. An information processing server managing a first service of distributing contents and a second service of providing a group chat room, the contents being provided to the server by a first terminal, the contents being distributed by the server in real time according to a reservation made in advance by the first terminal, and, to a plurality of second terminals requesting the use of the first service and the use of the second service, comprising:

an acquiring unit configured to acquire reservation information including a channel selection, sent by the first terminal to the information processing server, from a reservation data base in order to provide the first service to the plurality of second terminals, the plurality of second terminals receiving a distribution notice in accordance with a corresponding second terminal address of the reservation from the information processing server, the distribution notice including authentication data, an electronic mail address of a user of the first terminal, and an Internet webpage address of the user of the first terminal;

a generation unit configured to generate a group chat room corresponding to the reservation at a predetermined time prior to a distribution start time designated by the reservation;

a providing unit configured to provide the group chat room to the first terminal and the plurality of second terminals coincident with the first service, the plurality of second terminals accessing the group chat room and first service in accordance with authentication data of the received distribution notice upon a first contact with the server; and a viewer counting unit configured to count a number of viewers of contents distributed by the user of the first terminal and to display the number of viewers.

2. An information processing server according to claim 1, wherein the generation unit deletes the group chat room a predetermined time after a distribution end time.

3. An information processing method for an information processing server managing a first service of distributing contents and a second service of providing a group chat room, the contents being provided to the server by a first terminal, the contents being distributed by the server in real time according to a reservation made in advance by the first terminal, and, to a plurality of second terminals requesting the use of the first service and the use of the second service, comprising:

acquiring reservation information including a channel selection, sent by the first terminal to the information processing server, from a reservation data base in order to provide the first service to the plurality of second terminals, the plurality of second terminals receiving a distribution notice in accordance with a corresponding second terminal address of the reservation from the information processing server, the distribution notice including authentication data, an electronic mail address of a user of the first terminal, and an Internet webpage address of the user of the first terminal;

generating the group chat room corresponding to a group reservation at a predetermined time prior to a distribution start time designated by the reservation;

providing the group chat room to the first terminal and the plurality of second terminals coincident with the first service, the plurality of second terminals accessing the group chat room and first service in accordance with authentication data of the received distribution notice upon a first contact with the server;

counting a number of viewers of contents distributed by the user of the first terminal; and displaying the number of viewers.

4. A computer readable storage medium storing a computer-readable program for an information processing server managing a first service of distributing contents and a second service of providing a group chat room, the contents being provided to the server by a first terminal, the contents being distributed by the server in real time according to a reservation made in advance by the first terminal, and, to a plurality of second terminals requesting the use of the first service and the use of the second service, comprising:

acquiring reservation information including a channel selection, sent by the first terminal to the information processing server from a reservation data base in order to provide the first service to the plurality of second terminals, the plurality of second terminals receiving a distribution notice in accordance with a corresponding second terminal address of the reservation from the information processing server, the distribution notice including authentication data, an electronic mail address of a user of the first terminal, and an Internet webpage address of the user of the first terminal;

generating the group chat room corresponding to a group reservation at a predetermined time prior to a distribution start time designated by the reservation;

providing the group chat room to the first terminal and the plurality of second terminals coincident with the first service, the plurality of second terminals accessing the group chat room and first service in accordance with authentication data of the received distribution notice upon a first contact with the server;

counting a number of viewers of contents distributed by the user of the first terminal; and displaying the number of viewers.

5. A computer readable storage medium including computer program instructions to cause a computer to implement a method of managing a first service of distributing contents and a second service of providing a group chat room, the contents being provided to the server by a first terminal, the contents being distributed by the server in real time according to a reservation made in advance by the first terminal, and, to a plurality of second terminals requesting the use of the first service and the use of the second service, comprising:

acquiring reservation information including a channel selection, sent by the first terminal to the information processing server, from a reservation data base in order to provide the first service to the plurality of second terminals, the plurality of second terminals receiving a distribution notice in accordance with a corresponding second terminal address of the reservation from the information processing server, the distribution notice including authentication data, an electronic mail address of a user of the first terminal, and an Internet webpage address of the user of the first terminal;

generating the group chat room corresponding to a group reservation at a predetermined time prior to a distribution start time designated by the reservation;

recording the chat conducted in the chat room during the distribution of contents by participating terminals in association with a reservation of the first terminal;

providing the group chat room to the first terminal and the plurality of second terminals coincident with the first service, the plurality of second terminals accessing the group chat room and first service in accordance with authentication data of the received distribution notice upon a first contact with the server;

counting a number of viewers of contents distributed by the user of the first terminal; and displaying the number of viewers.

6. The information processing server of claim 1, wherein the generation unit records the chat conducted in the chat room in association with a reservation of the first terminal whereby the chat conducted in the chat room is identified for forwarding to the first terminal upon completion of the first service.

7. The information processing method of claim 3, further comprising:

recording the chat conducted in the chat room in association with a reservation of the first terminal whereby the chat conducted in the chat room is identified for forwarding to the first terminal upon completion of the first service.

8. The computer readable storage medium of claim 4, wherein the program records the chat conducted in the chat room in association with a reservation of the first terminal whereby the chat conducted in the chat room is identified for forwarding to the first terminal upon completion of the first service.

9. The computer readable storage medium of claim 5, wherein the computer program instructions cause the computer to record the chat conducted in the chat room in association with a reservation of the first terminal whereby the chat conducted in the chat room is identified for forwarding to the first terminal upon completion of the first service.

10. An information processing server managing a first service of distributing contents, the contents being provided to the server by a first terminal, the contents being distributed by the server in real time according to a reservation made in advance by the first terminal, and, to a plurality of second terminals requesting the use of the first service, comprising:

an acquiring unit configured to acquire reservation information including a channel selection sent by the first terminal to the information processing server, the reservation information including an Internet webpage address of the user of the first terminal;

a reservation providing unit configured to provide the reservation information to the plurality of second terminals;

a contents distribution unit configured to distribute the contents to the plurality of second terminals; and a viewer counting unit configured to count a number of viewers of contents distributed by the user of the first terminal and to display the number of viewers.

11. An information processing server recited in claim 10, wherein the reservation information further includes a genre of the contents.

12. An information processing server recited in claim 10, wherein the reservation information further includes a description of the contents.

13. An information processing server recited in claim 10, wherein the reservation information further includes a reservation date and a reservation time.

14. An information processing server recited in claim 10, wherein the reservation information further includes an electronic mail address of a user of the first terminal.

* * * * *